US012333531B2

(12) United States Patent
Osborn et al.

(10) Patent No.: US 12,333,531 B2
(45) Date of Patent: *Jun. 17, 2025

(54) SYSTEMS AND METHODS FOR SECURE REPROVISIONING

(71) Applicant: Capital One Services, LLC, McLean, VA (US)

(72) Inventors: Kevin Osborn, Newton Highlands, MA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,389

(22) Filed: Sep. 5, 2023

(65) Prior Publication Data

US 2025/0078069 A1 Mar. 6, 2025

Related U.S. Application Data

(63) Continuation of application No. 17/161,285, filed on Jan. 28, 2021, now Pat. No. 11,792,001.

(51) Int. Cl.
*G06Q 20/38* (2012.01)
*G06Q 20/10* (2012.01)

(52) U.S. Cl.
CPC ..... *G06Q 20/3829* (2013.01); *G06Q 20/1085* (2013.01)

(58) Field of Classification Search
CPC ... H04L 9/0891; H04L 9/0877; H04L 9/0825; H04L 9/0897; H04L 63/0428;
(Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 | 7/2017 |
| CN | 101192295 | 6/2008 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Mohammed Waliullah
(74) *Attorney, Agent, or Firm* — KDW Firm PLLC; Andrew D. Kasnevich

(57) ABSTRACT

Systems and methods for authentication may include a first device having an association with a first account, including a memory containing one or more applets, a counter value, and transmission data, a communication interface, and one or more processors in communication with the memory and communication interface. The first device may create a cryptogram based on the counter value, wherein the cryptogram includes the counter value and the transmission data. The first device may transmit, after entry of the communication interface into a communication field, the cryptogram, and update, after transmission of the cryptogram, the counter value. The first device may receive, via the communication interface, one or more encrypted keys and one or more parameters. The first device may decrypt the one or more encrypted keys and, after decryption of the one or more encrypted keys, switch an association from the first account to a second account.

20 Claims, 7 Drawing Sheets

(58) Field of Classification Search
CPC ............. H04L 63/0492; H04L 63/0853; H04L 2209/56; H04L 2209/805; G06Q 20/3572; G06Q 20/3574; G06Q 20/38215; G06Q 20/227; G06Q 20/3415; G06Q 20/3563; G06Q 20/3829; G06Q 20/385; G06Q 20/4093; G07F 19/206; H04W 12/04; H04W 12/47; H04W 4/80; H04W 12/35; H04W 12/06
See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |

(56) References Cited

U.S. PATENT DOCUMENTS

| | | |
|---|---|---|
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,135,614 B2 * | 11/2018 | Roberts .............. G06Q 20/3829 |
| 10,217,105 B1 | 2/2019 | Sangi et al. |
| 10,542,036 B1 * | 1/2020 | Duane ................. H04L 63/0853 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |

(56) References Cited

U.S. PATENT DOCUMENTS

| | | |
|---|---|---|
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |

(56) References Cited

U.S. PATENT DOCUMENTS

| | | |
|---|---|---|
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0359850 A1* | 12/2016 | Weiss .................. H04L 63/0846 |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0057664 A1* | 2/2020 | Durham .............. G06F 12/1408 |
| 2020/0104830 A1 | 4/2020 | Hart et al. |
| 2020/0184462 A1 | 6/2020 | Rule et al. |
| 2020/0366490 A1 | 11/2020 | Osborn et al. |
| 2021/0176230 A1* | 6/2021 | Cho .................... H04W 12/086 |

FOREIGN PATENT DOCUMENTS

| | | | |
|---|---|---|---|
| CN | 103023643 | 4/2013 | |
| CN | 103417202 | 12/2013 | |
| EP | 1 085 424 | 3/2001 | |
| EP | 1 223 565 | 7/2002 | |
| EP | 1 265 186 | 12/2002 | |
| EP | 1 783 919 | 5/2007 | |
| EP | 2 852 070 | 1/2009 | |
| EP | 2 139 196 | 12/2009 | |
| EP | 1 469 419 | 2/2012 | |
| GB | 2 457 221 | 8/2009 | |
| GB | 2 516 861 | 2/2015 | |
| GB | 2 551 907 | 1/2018 | |
| KR | 20130082845 | 7/2013 | |
| KR | 20130082845 A * | 7/2013 | ........... G06Q 20/341 |
| KR | 101508320 | 4/2015 | |
| WO | WO 00/49586 | 8/2000 | |
| WO | WO 2006070189 | 7/2006 | |
| WO | WO 2008055170 | 5/2008 | |
| WO | WO 2009025605 | 2/2009 | |
| WO | WO 2010049252 | 5/2010 | |
| WO | WO 2011112158 | 9/2011 | |
| WO | WO 2012001624 | 1/2012 | |
| WO | WO 2013039395 | 3/2013 | |
| WO | WO 2013155562 | 10/2013 | |
| WO | WO 2013192358 | 12/2013 | |
| WO | WO 2014043278 | 3/2014 | |
| WO | WO 2014170741 | 10/2014 | |
| WO | WO 2015179649 | 11/2015 | |
| WO | WO 2015183818 | 12/2015 | |
| WO | WO 2016097718 | 6/2016 | |
| WO | WO 2016160816 | 10/2016 | |
| WO | WO 2016168394 | 10/2016 | |
| WO | WO 2017042375 | 3/2017 | |
| WO | WO 2017042400 | 3/2017 | |
| WO | WO 2017157859 | 9/2017 | |
| WO | WO 2017208063 | 12/2017 | |
| WO | WO 2018063809 | 4/2018 | |
| WO | WO 2018137888 | 8/2018 | |
| WO | WO 2020197221 | 10/2020 | |
| WO | WO-2020197221 A1 * | 10/2020 | ........... H04L 9/0841 |
| WO | WO 2021011354 | 1/2021 | |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

(56) References Cited

OTHER PUBLICATIONS

Pourghomi, Pardis et al., "A Proposed NFC Payment Application," International Journal of Advanced Computer Science and Applications, vol. 4, No. 8 (2013).
Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_201206070619239000.pdf, 174 pages.
Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™M", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.

(56) References Cited

OTHER PUBLICATIONS

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

International Search Report and the Written Opinion of the International Searching Authority issued in related PCT Application No. PCT/US2022/013899 mailed Apr. 25, 2022.

Notification Concerning Transmittal of International Preliminary Report on Patentability from related PCT Application No. PCT/US2022/013899, mailed Aug. 10, 2023.

\* cited by examiner

SYSTEMS AND METHODS FOR SECURE REPROVISIONING

CROSS-REFERENCE TO RELATED APPLICATION

The subject application is a continuation of U.S. patent application Ser. No. 17/161,285 filed Jan. 28, 2021, the contents of which is hereby incorporated by reference in their entirety.

FIELD OF THE DISCLOSURE

The present disclosure relates to systems and methods for secure reprovisioning, including the secure reprovisioning of contact-based cards and contactless cards.

BACKGROUND

Card-based transactions are becoming increasingly common. These transactions often involve the use of a card, such as a contact-based card or a contactless card, in communication with a point of sale device, a server, or other device. It is necessary to protect such communications from interception and unauthorized access. However, transmission of data is susceptible to phishing attacks and replay attacks, resulting in increased security risks and account or card misuse.

For contact-based cards, there is an increased security risk of card skimming which may further result in compromised security. Security risks may also be increased when using contactless cards, which communicate with other devices wirelessly. A contactless card using near field communication (NFC), Wi-Fi, or Bluetooth, for example, to transmit data encounters the risk that the data transmission will be intercepted or observed by an unauthorized or malicious reader.

If a security risk, misuse, unauthorized access, or other problem is encountered, reissuance of the card may be required. Reissuance of the card can further lead to security concerns, as malicious attackers may be aware of the original card, as well as the disruption of the ability of a user to engage in activity with the associated account. For example, a card that is mailed may be intercepted en route to a user and subject to misuse. Additionally, fraudulent actors may change the address such that the card is reissued to the address of their choice. Further, a card that has been mailed may be read contactlessly through the envelope and the card number may be skimmed.

These and other deficiencies exist. Accordingly, there is a need for systems and methods for authenticating secure card reprovisioning that overcome these deficiencies and results in a transition from a first account to a second account in a secure and reliable manner by protecting communications from interception and unauthorized access.

SUMMARY OF THE DISCLOSURE

Embodiments of the present disclosure provide a secure reprovisioning system. The secure reprovisioning system may include a first device. The first device having an association with a first account. The first device may include a memory containing one or more applets, a counter value, and transmission data. The first device may include a communication interface. The first device may include one or more processors in communication with the memory and communication interface. The first device may be configured to create a cryptogram based on the counter value, wherein the cryptogram includes the counter value and the transmission data. The first device may be configured to transmit, after entry of the communication interface into a communication field, the cryptogram. The first device may be configured to update, after transmission of the cryptogram, the counter value. The first device may be configured to receive, via the communication interface, one or more encrypted keys and one or more parameters. The first device may be configured to decrypt the one or more encrypted keys. The first device may be configured to, after decryption of the one or more encrypted keys, switch an association from the first account to a second account.

Embodiments of the present disclosure provide a method for secure reprovisioning. The method may include creating a cryptogram based on a counter value, wherein the cryptogram includes the counter value and transmission data. The method may include transmitting, via a communication interface, the cryptogram. The method may include updating the counter value. The method may include receiving, via the communication interface, a first set of one or more encrypted keys and a first set of one or more parameters. The method may include decrypting the first set of one or more encrypted keys. The method may include changing an association from a first account to a second account.

Embodiments of the present disclosure provide a computer readable non-transitory medium comprising computer-executable instructions that are executed on a processor and comprising the steps of: creating a cryptogram based on a counter value, wherein the cryptogram includes the counter value and transmission data; transmitting, via a communication interface, the cryptogram; updating the counter value; receiving, via the communication interface, a command-application protocol data unit including one or more encrypted keys, one or more parameters, one or more applet identifiers, and one or more instructions associated with a class; decrypting the one or more encrypted keys in accordance with the one or more instructions; switching an association from a first account to a second account; and transmitting a response-application protocol data unit indicating an execution status associated with the one or more instructions.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
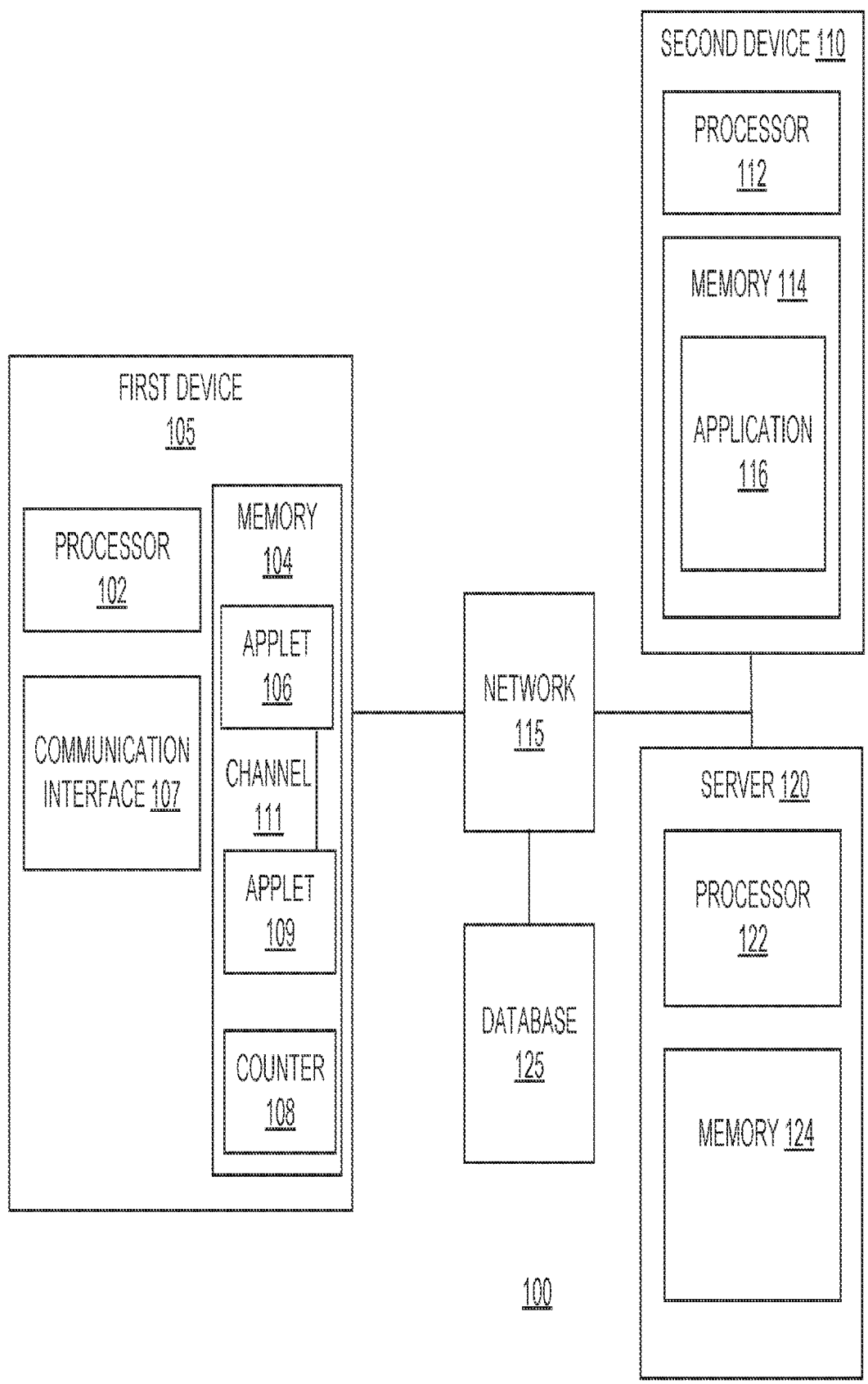
FIG. 1 depicts a secure reprovisioning system according to an exemplary embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Benefits of the systems and methods disclosed herein include improved security for authenticating secure card reprovisioning that results in a transition from a first account to a second account in a secure and reliable manner by protecting communications from interception and unauthorized access. The systems and methods disclosed herein allow for the avoidance of phishing attacks and preventing replay attacks, thereby increasing security. Security can also be increased by reducing the risks of other common attacks. For example, the systems and methods disclosed herein reduce the risk of card skimming attacks for contact-based cards and the risk of the unauthorized observance or interception of data transmissions for contactless cards through the use of encrypted data communications. As another example, the systems and methods disclosed herein provide for securely reprovisioning cards via multifactor authentication.

Accordingly, keys of cards may be securely generated, encrypted, and reissued, rather than collecting the cards, and programming each card for reissuance, thereby mitigating security risks, reducing costs, and improving transaction efficiency. These benefits may be achieved without inconveniencing the user or otherwise degrading the user experience with a reissuance process. This avoids disruption, reduces the time and costs associated with card reissuance processes, and allows the user to continue engaging in activity with the associated account. By having the card reissuance handled at an automated teller machine (ATM), authentication and controlled access to the ATM is more secure. As another benefit, the need to deliver cards through the mail can be reduced or eliminated, which improves security and reduces the risk of cards being intercepted in the mail, the risk of fraudulent manipulation of delivery addresses to redirect cards to incorrect or unauthorized addresses, and the risk of card number skimming of cards in the mail.

Accordingly, the systems and methods disclosed herein reduce the risk of fraudulent activity, such as misuse of the card or an account associated with the card, in a secure and unobtrusive manner that does not inconvenience the user.

FIG. 1 illustrates a secure reprovisioning system 100. The system 100 may comprise a first device 105, a second device 110, a network 115, a server 120, and a database 125. Although FIG. 1 illustrates single instances of components of system 100, system 100 may include any number of components.

System 100 may include a first device 105. The first device 105 may comprise a contactless card, a contact-based card, a network-enabled computer, or other device described herein. As further explained below in FIGS. 2A-2B, first device 105 may include one or more processors 102, and memory 104. Memory 104 may include one or more applets 106 and one or more counters 108. Each counter 108 may include a counter value. Memory 104 may include the counter value, transmission data, and one or more keys.

First device 105 may include a communication interface 107. The communication interface 107 may comprise communication capabilities with physical interfaces and contactless interfaces. For example, the communication interface 107 may be configured to communicate with a physical interface, such as by swiping through a card swipe interface or inserting into a card chip reader found on an automated teller machine (ATM) or other device configured to communicate over a physical interface. In other examples, the communication interface 107 may be configured to establish contactless communication with a card reading device via a short-range wireless communication method, such as NFC, Bluetooth, Wi-Fi, RFID, and other forms of contactless communication. As shown in FIG. 1, the communication interface 107 may be configured to communicate directly with the second device 110, server 120, and/or database 125 via network 115.

First device 105 may be in data communication with any number of components of system 100. For example, first device 105 may transmit data via network 115 to second device 110, and/or server 120. First device 105 may transmit data via network 115 to database 125. In some examples, first device 105 may be configured to transmit data via network 115 after entry into one or more communication fields of any device. Without limitation, each entry may be associated with a tap, a swipe, a wave, and/or any combination thereof.

System 100 may include a second device 110. The second device 110 may include one or more processors 112, and memory 114. Memory 114 may include one or more applications 116, including but not limited to a first application. Second device 110 may be in data communication with any number of components of system 100. For example, second device 110 may transmit data via network 115 to server 120. Second device 110 may transmit data via network 115 to database 125. Without limitation, second device 110 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device. Second device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 110 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 115. In some examples, network 115 may be one or more of a wireless network, a wired network or any combination of wireless network and wired network, and may be configured to connect to any one of components of system 100. For example, first device 105 may be configured to connect to server 120 via network 115. In some examples, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors 122 coupled to memory 124. Server 120 may be configured as a central system, server or platform to control and call various data at different times to execute a plurality of workflow actions. Server 120 may be configured to connect to first device 105. Server 120 may be in data communication with the applet 106 and/or application 116. For example, a server 120 may be in data communication with applet 106 via one or more networks 115. First device 105 may be in communication with one or more servers 120 via one or more networks 115, and may operate as a respective front-end to back-end pair with server 120. First device 105 may transmit, for example from applet 106 executing thereon, one or more requests to server 120. The one or more requests may be associated with retrieving data from server 120. Server 120 may receive the one or more requests from first device 105. Based on the one or more requests from applet 106, server 120 may be configured to retrieve the requested data. Server 120 may be configured to transmit the received data to applet 106, the received data being responsive to one or more requests.

In some examples, server 120 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 120, it is understood that other embodiments can use multiple servers or multiple computer systems as necessary or desired to support the users and can also use back-up or redundant servers to prevent network downtime in the event of a failure of a particular server.

Server 120 may include an application comprising instructions for execution thereon. For example, the application may comprise instructions for execution on the server 120. The application may be in communication with any components of system 100. For example, server 120 may execute one or more applications that enable, for example, network and/or data communications with one or more components of system 100 and transmit and/or receive data. Without limitation, server 120 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 120 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 120 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include one or more databases 125. The database 125 may comprise a relational database, a non-relational database, or other database implementations, and any combination thereof, including a plurality of relational databases and non-relational databases. In some examples, the database 125 may comprise a desktop database, a mobile database, or an in-memory database. Further, the database 125 may be hosted internally by any component of system 100, such as the first device 105 or server 120, or the database 125 may be hosted externally to any component of the system 100, such as the first device 105 or server 120, by a cloud-based platform, or in any storage device that is in data communication with the first device 105 and server 120. In some examples, database 125 may be in data communication with any number of components of system 100. For example, server 120 may be configured to retrieve the requested data from the database 125 that is transmitted by applet 106. Server 120 may be configured to transmit the received data from database 125 to applet 106 via network 115, the received data being responsive to the transmitted one or more requests. In other examples, applet 106 may be configured to transmit one or more requests for the requested data from database 125 via network 115.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 105, second device 110, server 120, and/or database 125, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The one or more processors 102 may be configured to create a cryptogram using the at least one key and the counter value. The cryptogram may include the counter value and the transmission data. The one or more processors 102 may be configured to transmit the cryptogram via the communication interface 107. For example, the one or more processors 102 may be configured to transmit the cryptogram to one or more applications. In some examples, the one or more processors 102 may be configured to transmit the cryptogram to application 116 comprising instructions for execution on a second device 110. The one or more processors 102 may be configured to update the counter value after transmission of the cryptogram.

In some examples, the application 116 comprising instructions for execution on the second device 110 may be configured to encrypt one or more keys. Without limitation, the second device 110 may comprise an ATM, a kiosk, a point of sale device, or other device. The application 116 may be configured to transmit the one or more encrypted keys. In some examples, the application 116 may be configured to transmit one or more parameters. Without limitation, the one or more parameters may include at least one selected from the group of primary account number information, expiration date information, card verification code, and/or any combination thereof. In some examples, the one or more parameters may comprise dynamic information, such as changed personalization data including but not limited to card master keys, such as secret and public/private keys, and one or more spending limits. The application 116 may be configured to transmit one or more commands-application protocol data unit (C-APDU) including the one or more encrypted keys, the one or more parameters, one or more applet identifiers, and one or more instructions associated with a class of a header. In some examples, the application 116 may be configured to transmit the one or more commands-application protocol data unit to the first device 105 after one or more entries of the communication interface 107 into a communication field of the second device 110. Communication between the application 116 and first device 105 via near field communication (NFC). Without limitation, the one or more commands-application protocol data unit may be transmitted via Bluetooth, Wi-Fi, and Radio-Frequency Identification (RFID).

The first device 105 may be configured to receive the one or more encrypted keys and one or more parameters after input authentication. The first device 105 may be configured to receive the command-application protocol data unit including the one or more encrypted keys, the one or more parameters, one or more applet identifiers, and one or more instructions associated with a class of a header. In some examples, one or more session keys may be generated at the second device 110 or server 120, which may be used to encrypt one or more master keys. For example, one or more limited use session keys may be generated based on a cryptogram and a counter to encrypt data. The first device 105 may be configured to receive the encrypted data and decrypt it for storage. The one or more instructions may each be associated with a code, and include decrypting and/or confirmation of the one or more decrypted keys, storing and/or confirmation of the one or more decrypted keys. In some examples, the first device 105 may be configured to receive the one or more commands-application protocol data unit after input authentication. For example, input for the authentication may include, without limitation, at least one or more selected from the group of a personal identification number, a username and/or password, a mobile device number, an account number, a card number, and a biometric (e.g., facial scan, a retina scan, a fingerprint, and a voice input for voice recognition). The application 116 of the second device 110 may be configured to authenticate the input. In other examples, application 116 may be configured to transmit the input to server 120 for authentication of the input.

The first device 105 may be configured to receive the one or more commands-application protocol data unit on a predetermined basis. In some examples, the predetermined basis may be any number of seconds, minutes, hours, days, weeks, months, years, etc. In other examples, the first device may be configured to receive the one or more commands-application protocol data unit after determination of a security concern. For example, the server 120 may be configured to determine one or more security concerns. Without limitation, the one or more security concerns may be associated with identity theft, unauthorized usage based on transaction history and/or transaction frequency evaluated over any determined time period, a notice of fraudulent charges, and/or any combination thereof. For example, the server 120 may, responsive to determining any number of one or more security concerns associated with the first device 105, be configured to transmit one or more messages to the application 116 of the second device 110 to transmit the one or more commands-application protocol data unit. In this manner, the application 116 of the second device 110 may be configured to receive the one or more messages from the server 120, the one or more messages indicative of transmitting the one or more commands-application protocol data unit after determination of one or more security concerns.

The first device 105 may be subject to eligibility criteria. For example, after determination of the one or more security concerns, the first device 105 may subject to a prioritized list associated with eligibility prior to receipt of the one or more commands-application protocol data unit. In some examples, the server 120 may be configured to screen the first device 105 based on at least one selected from the group of time elapsed since issuance of the card, card usage for transactions, transaction type, card type, one or more determinations of the security concerns associated with the first device 105, and/or any combination thereof. In this manner, the server 120 may be configured to evaluate and rank how many first devices 105 and which types of first devices 105 may be configured to receive the one or more commands-application protocol data unit based on the eligibility criteria before signaling to the application 116 of the second device 110 to transmit the one or more commands-application protocol data unit. In one example, one or more sets of first devices 105 may be prioritized to receive the one or more commands-application protocol data unit after the server 120 is configured to determine whether the first device 105 is a credit card and is associated with a notice of fraudulent charges. In another example, one or more sets of first devices 105 may be prioritized to receive the one or more commands-application protocol data unit after the server 120 is configured to determine whether the first device 105 is an identification card that has been abnormally used, for example exceeding a predetermined threshold, for one or more transactions. In yet another example, one or more sets of first device 105 may be prioritized to receive the one or more commands-application protocol data unit after the server 120 is configured to determine how much time has elapsed since issuance of the first device 105. In these non-limiting examples, the server 120 may be further configured to prioritize which of these determinations are to be made first, second, third, etc. In this manner, a designated number of first devices 105 may be reprovisioned on an individual basis and/or in a batch. The first devices 105 may also be reprovisioned on an as-needed basis, according to a predetermined schedule, and/or any combination thereof.

The first device 105 may be configured to receive the one or more commands-application protocol data unit. For example, the first device 105 may be configured to receive the one or more commands-application protocol data unit from the application 116 of the second device 110. The first device 105 may be configured to decrypt the one or more encrypted keys. One or more applets, such as applet 106, of the first device 105 may be configured to store one or more decrypted keys in a secure element. An applet 106, such as a first applet, may be configured to transmit, via a communication channel 111, the one or more decrypted keys and the one or more parameters to a second applet 109. After decryption of the one or more encrypted keys, the first device 105 may be configured to change an association from a first account to a second account. Moreover, the first device 105 may be restricted to a predetermined usage after decryption of the one or more encrypted keys. In one example, the first device 105 may be subject to one or more predetermined spending thresholds. In another example, the first device 105 may be subject to a predetermined number of uses. For example, the first device 105 may be used for only a designated set of transactions, such as for lunch only and/or for office furniture. In another example, the first device 105 may be subject to a predetermined number of usages for one or more types of transactions, including but not limited to a debit card transaction or a credit card transaction.

In another example, the first device 105 may be used for only transactions occurring during a certain time (e.g., business hours of 9:00 am to 5:00 pm), on certain days of the week (e.g., weekdays, weekends, only Mondays, only Thursdays and Fridays), of on a certain date (e.g., Wednesday, Jul. 1, 2020). In another example, the first device 105 may be used only for certain purposes, such as for expense account purposes (e.g., travel expenses including airfare, meals, and hotels), for a designated project (e.g., a certain type of equipment or hardware needed for a project), with designated or approved merchants, or with a specified list of merchants known to offer goods or services needed for a particular purposes.

It is understood that the foregoing listings are exemplary and that any of these examples can be used in combination with one another. Thus, a user may use the same card configured for a variety of purposes and with a variety of accounts.

The first device 105 may be configured to transmit, responsive to the one or more commands-application protocol data unit, one or more responses-application protocol data unit (R-APDU). The one or more responses-application protocol data unit may include one or bytes indicative of a status of the command. For example, at least one of the one or more responses-application protocol data unit may be configured to indicate an execution status associated with the one or more instructions. The first device 105 may be configured to transmit the one or more responses-application protocol data unit to the application 116 of the second device 110. In some examples, the first device 105 may be configured to return a successful execution status associated with the one or more instructions. To the extent that the execution status of the one or more instructions is not successful, the first device 105 may be configured to return a warning or unsuccessful execution status. For example, the one or more responses-application protocol data unit may be configured to indicate if and when the one or more encrypted keys were decrypted and/or if and when the one or more decrypted keys were stored.

The application 116 may be configured to receive the one or more responses-application protocol data unit from the first device 105. For example, the one or more responses-application protocol data unit may be received after one or more entries of the communication interface 107 into a communication field of the second device 110. The one or more entries may be associated with at least one selected from the group of a tap, a swipe, a wave, and/or any combination thereof. Depending on the results of the execution status of the one or more instructions, the application 116 may be configured to take one or more corrective actions. In one example, the application 116 may be configured to re-send the one or more commands-application protocol data unit if the execution status of the one or more instructions is unsuccessful. In another example, the application 116 may be configured to re-send the one or more commands-application protocol data unit if the execution status of the one or more instructions is not received from the first device 105 within a predetermined time, including but not limited to any number of seconds, minutes, hours, days, etc. In yet another example, the application 116 may be configured to notify the server 120 if the one or more commands-application protocol data unit if the execution status of the one or more instructions is successful. In yet another example, the application 116 may be configured to notify the server 120 if the one or more commands-application protocol data unit if the execution status of the one or more instructions is received within the predetermined time.

Figure 2A:
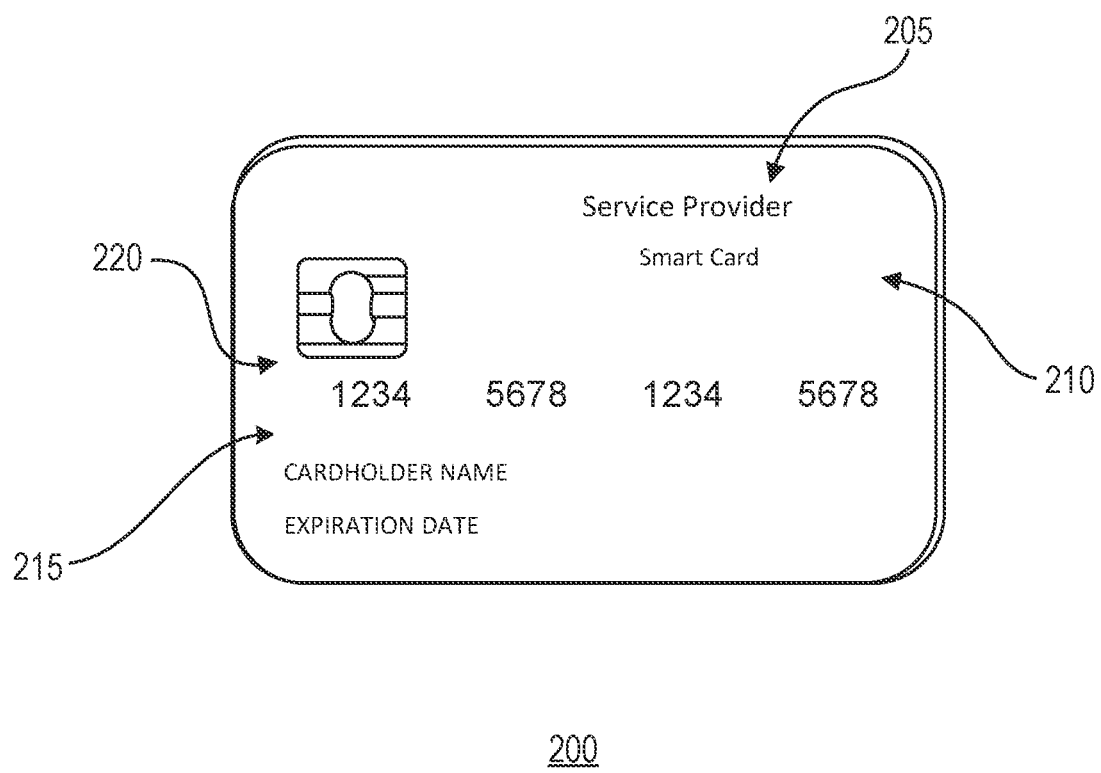
FIG. 2A is an illustration of a first device according to an exemplary embodiment.

FIG. 2A illustrates one or more first devices 200. First device 200 may reference the same or similar components of first device 105, as explained above with respect to FIG. 1. Although FIGS. 2A and 2B illustrate single instances of components of first device 200, any number of components may be utilized.

First device 200 may be configured to communicate with one or more components of system 100. First device 200 may comprise a contact-based card or contactless card, which may comprise a payment card, such as a credit card, debit card, or gift card, issued by a service provider 205 displayed on the front or back of the first device 200. In some examples, the first device 200 is not related to a payment card, and may comprise, without limitation, an identification card, a membership card, and a transportation card. In some examples, the payment card may comprise a dual interface contactless payment card. The first device 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the first device 200 may have physical characteristics compliant with the ID-1 format of the ISO/IEC 7810 standard, and the contactless card may otherwise be compliant with the ISO/IEC 14443 standard. However, it is understood that the first device 200 according to the present disclosure may have different characteristics, and the present disclosure does not require a contactless card to be implemented in a payment card.

The first device 200 may also include identification information 215 displayed on the front and/or back of the card, and a contact pad 220. The contact pad 220 may be configured to establish contact with another communication device, including but not limited to a user device, smart phone, laptop, desktop, or tablet computer. The first device 200 may also include processing circuitry, antenna and other components not shown in FIG. 2A. These components may be located behind the contact pad 220 or elsewhere on the substrate 210. The first device 200 may also include a magnetic strip or tape, which may be located on the back of the card (not shown in FIG. 2A).

Figure 2B:
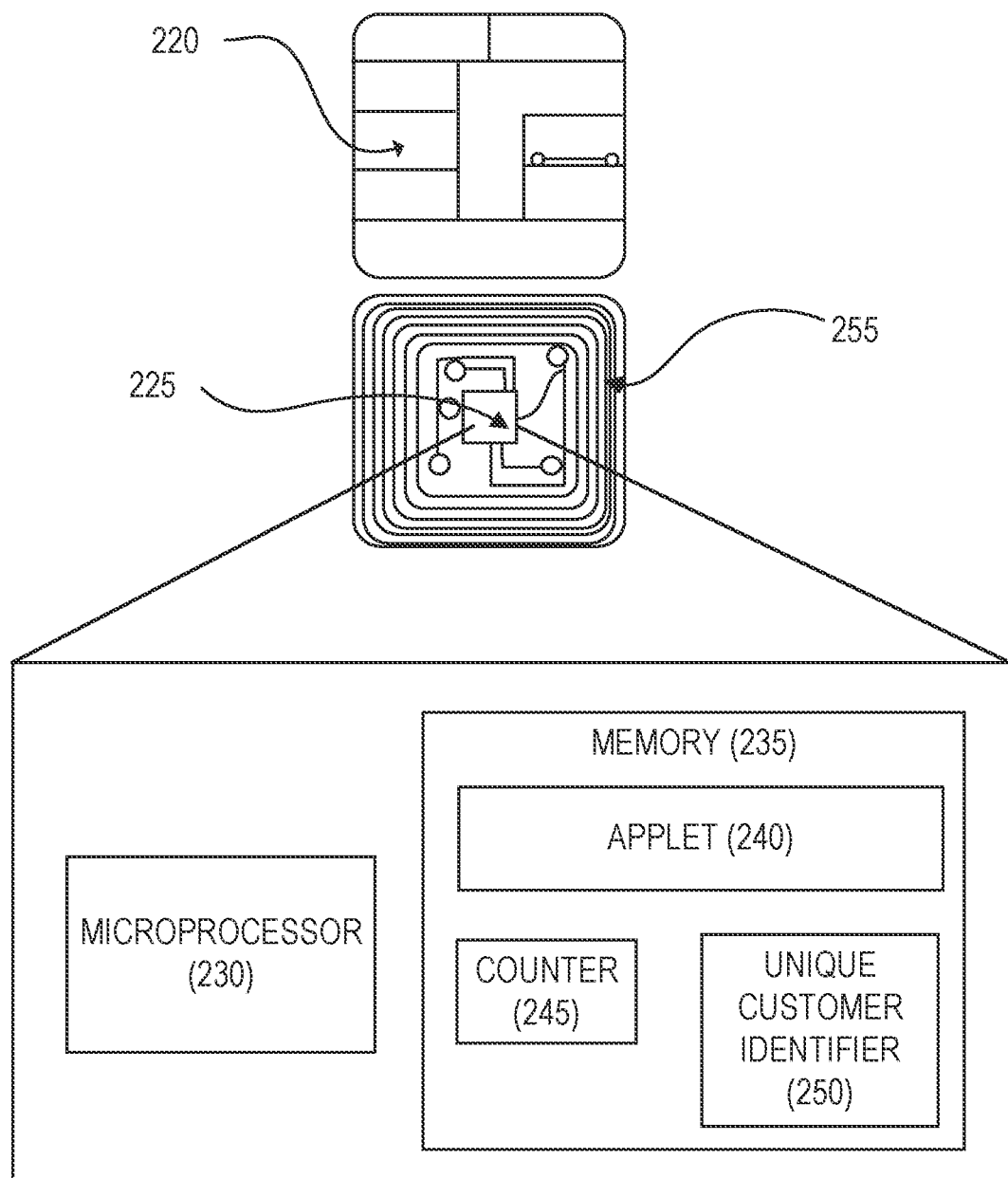
FIG. 2B is an illustration of a contact pad of a first device according to an exemplary embodiment.

As illustrated in FIG. 2B, the contact pad 220 of FIG. 2A may include processing circuitry 225 for storing and processing information, a processor 230, such as a microprocessor, and a memory 235. It is understood that the processing circuitry 225 may contain additional components, including processors, memories, error and parity/CRC checkers, data encoders, anticollision algorithms, controllers, command decoders, security primitives and tamper-proofing hardware, as necessary to perform the functions described herein.

The memory 235 may be a read-only memory, write-once read-multiple memory or read/write memory, e.g., RAM, ROM, and EEPROM, and the first device 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that the one or more applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the first device 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the contact pad 220 or entirely separate from it, or as further elements in addition to processor 230 and memory 235 elements located within the contact pad 220.

In some examples, the first device 200 may comprise one or more antennas 255. The one or more antennas 255 may be placed within the first device 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of first device 200 may act as the secondary of an air core transformer. The terminal may communicate with the first device 200 by cutting power or amplitude modulation. The first device 200 may infer the data transmitted from the terminal using the gaps in the contactless card's power connection, which may be functionally maintained through one or more capacitors. The first device 200 may communicate back by switching a load on the contactless card's coil or load modulation. Load modulation may be detected in the terminal's coil through interference.

Figure 3:
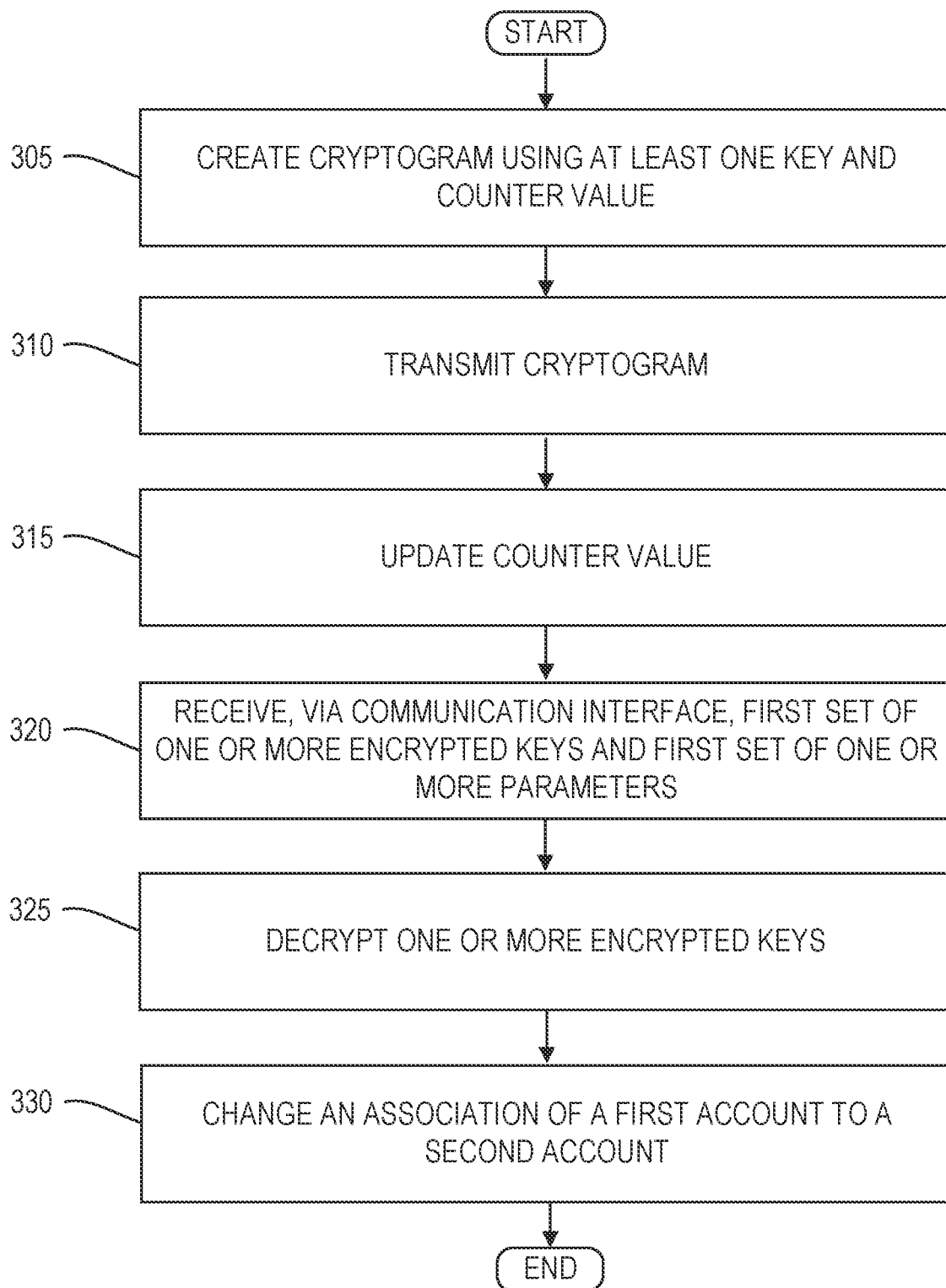
FIG. 3 depicts a method of secure reprovisioning according to an exemplary embodiment.

FIG. 3 depicts a method 300 of secure reprovisioning. FIG. 3 may reference the same or similar components of system 100, and first device 200 of FIG. 2A and FIG. 2B.

At block 305, the method 300 may include creating a cryptogram using at least one key and a counter value. For example, one or more processors of a first device may be configured to create a cryptogram using the at least one key and the counter value. The cryptogram may include the counter value and the transmission data. The first device may include a memory containing one or more keys, including the at least one key, a counter value, and the transmission data. The first device may further include a communication interface.

At block 310, the method 300 may include transmitting the cryptogram. For example, the one or more processors may be configured to transmit the cryptogram via the communication interface. For example, the one or more processors may be configured to transmit the cryptogram to one or more applications. In some examples, the one or more processors may be configured to transmit the cryptogram to an application comprising instructions for execution on a second device.

At block 315, the method 300 may include updating the counter value. For example, the one or more processors may be configured to update the counter value after transmission of the cryptogram.

At block 320, the method 300 may include receiving, via the communication interface, a first set of one or more encrypted keys and a first set of one or more parameters. In some examples, the application comprising instructions for execution on the second device may be configured to encrypt one or more keys. Without limitation, the second device may comprise an ATM, a kiosk, a register, or other point of sale device. The application may be configured to transmit the one or more encrypted keys. In some examples, the application may be configured to transmit one or more parameters. Without limitation, the one or more parameters may include at least one selected from the group of primary account number information, expiration date information, card verification code, and/or any combination thereof. In some examples, the one or more parameters may comprise dynamic information, such as changed personalization data including but not limited to card master keys, such as secret and public/private keys, and one or more spending limits. The application may be configured to transmit one or more commands-application protocol data unit including the one or more encrypted keys, the one or more parameters, one or more applet identifiers, and one or more instructions associated with a class of a header. In some examples, one or more session keys may be generated at the second device or server, which may be used to encrypt one or more master keys. In some examples, the application may be configured to transmit the one or more commands-application protocol data unit to the first device after one or more entries of the communication interface into a communication field of the second device. Communication between the application and first device via NFC. Without limitation, the one or more commands-application protocol data unit may be transmitted via Bluetooth, Wi-Fi, and RFID.

The first device may be configured to receive the one or more commands-application protocol data unit on a predetermined basis. In some examples, the predetermined basis may be any number of seconds, minutes, hours, days, weeks, months, years, etc. In other examples, the first device may be configured to receive the one or more commands-application protocol data unit after determination of a security concern. For example, the server may be configured to determine one or more security concerns. Without limitation, the one or more security concerns may be associated with identity theft, unauthorized usage based on transaction history and/or transaction frequency evaluated over any determined time period, a notice of fraudulent charges, and/or any combination thereof. For example, the server may, responsive to determining any number of one or more security concerns associated with the first device, be configured to transmit one or more messages to the application of the second device to transmit the one or more commands-application protocol data unit. In this manner, the application of the second device may be configured to receive the one or more messages from the server, the one or more messages indicative of transmitting the one or more commands-application protocol data unit after determination of one or more security concerns.

The first device may be subject to eligibility criteria. For example, after determination of the one or more security concerns, the first device may subject to a prioritized list associated with eligibility prior to receipt of the one or more commands-application protocol data unit. In some examples, the server may be configured to screen the first device based on at least one selected from the group of time elapsed since issuance of the card, card usage for transactions, transaction type, card type, one or more determinations of the security concerns associated with the first device, and/or any combination thereof. In this manner, the server may be configured to evaluate and rank how many first devices and which types of first devices may be configured to receive the one or more commands-application protocol data unit based on the eligibility criteria before signaling to the application of the second device to transmit the one or more commands-application protocol data unit. In one example, one or more sets of first devices may be prioritized to receive the one or more commands-application protocol data unit after the server is configured to determine whether the first device is a credit card and is associated with a notice of fraudulent charges. In another example, one or more sets of first devices may be prioritized to receive the one or more commands-application protocol data unit after the server is configured to determine whether the first device is an identification card that has been abnormally used, for example exceeding a predetermined threshold, for one or more transactions. In yet another example, one or more sets of first device may be prioritized to receive the one or more commands-application protocol data unit after the server is configured to determine how much time has elapsed since issuance of the first device. In these non-limiting examples, the server may be further configured to prioritize which of these determinations are to be made first, second, third, etc. In this manner, a designated number of first devices may be reprovisioned on an individual basis and/or in a batch. The first devices may also be reprovisioned on an as-needed basis, according to a predetermined schedule, and/or any combination thereof.

The first device may be configured to receive the one or more encrypted keys and one or more parameters after input authentication. The first device may be configured to receive the command-application protocol data unit including the one or more encrypted keys, the one or more parameters, one or more applet identifiers, and one or more instructions associated with a class of a header. In some examples, one or more session keys may be generated at the second device or server, which may be used to encrypt one or more master keys. For example, one or more limited use session keys may be generated based on a cryptogram and a counter to encrypt data. The first device may be configured to receive the encrypted data and decrypt it for storage. The one or more instructions may each be associated with a code, and include decrypting and/or confirmation of the one or more decrypted keys, storing and/or confirmation of the one or more decrypted keys. In some examples, the first device may be configured to receive the one or more commands-application protocol data unit after input authentication. For example, input for the authentication may include, without limitation, at least one or more selected from the group of a personal identification number, a username and/or password, a mobile device number, an account number, a card number, and a biometric (e.g., facial scan, a retina scan, a fingerprint, and a voice input for voice recognition). The application of the second device may be configured to authenticate the input. In other examples, application may be configured to transmit the input to a server for authentication of the input.

At block 325, the method 300 may include decrypting the first set of one or more encrypted keys. The first device may be configured to receive the one or more commands-application protocol data unit. For example, the first device may be configured to receive the one or more commands-application protocol data unit from the application of the second device. The first device may be configured to decrypt the one or more encrypted keys. One or more applets of the first device may be configured to store one or more decrypted keys in a secure element. A first applet may be configured to transmit, via a communication channel, the one or more decrypted keys and the one or more parameters to a second applet.

At block 330, the method 300 may include changing an association from a first account to a second account. After decryption of the one or more encrypted keys, the first device may be configured to change an association from a first account to a second account. Moreover, the first device may be restricted to a predetermined usage after decryption of the one or more encrypted keys. In one example, the first device may be subject to one or more predetermined spending thresholds. In another example, the first device may be subject to a predetermined number of uses. For example, the first device may be used for only a designated set of transactions, such as for lunch only and/or for office furniture. In another example, the first device may be subject to a predetermined number of usages for one or more types of transactions, including but not limited to a debit card transaction or a credit card transaction.

In another example, the first device may be used for only transactions occurring during a certain time (e.g., business hours of 9:00 am to 5:00 pm), on certain days of the week (e.g., weekdays, weekends, only Mondays, only Thursdays and Fridays), of on a certain date (e.g., Wednesday, Jul. 1, 2020). In another example, the first device may be used only for certain purposes, such as for expense account purposes (e.g., travel expenses including airfare, meals, and hotels), for a designated project (e.g., a certain type of equipment or hardware needed for a project), with designated or approved merchants, or with a specified list of merchants known to offer goods or services needed for a particular purposes.

It is understood that the foregoing listings are exemplary and that any of these examples can be used in combination with one another. Thus, a user may use the same card configured for a variety of purposes and with a variety of accounts.

The first device may be configured to transmit, responsive to the one or more commands-application protocol data unit, one or more responses-application protocol data unit. The one or more responses-application protocol data unit may include one or bytes indicative of a status of the command. For example, at least one of the one or more responses-application protocol data unit may be configured to indicate an execution status associated with the one or more instructions. The first device may be configured to transmit the one or more responses-application protocol data unit to the application of the second device. In some examples, the first device may be configured to return a successful execution status associated with the one or more instructions. To the extent that the execution status of the one or more instructions is not successful, the first device may be configured to return a warning or unsuccessful execution status. For example, the one or more responses-application protocol data unit may be configured to indicate if and when the one or more encrypted keys were decrypted and/or if and when the one or more decrypted keys were stored.

The application may be configured to receive the one or more responses-application protocol data unit from the first device. For example, the one or more responses-application protocol data unit may be received after one or more entries of the communication interface into a communication field of the second device. The one or more entries may be associated with at least one selected from the group of a tap, a swipe, a wave, and/or any combination thereof. Depending on the results of the execution status of the one or more instructions, the application may be configured to take one or more corrective actions. In one example, the application may be configured to re-send the one or more commands-application protocol data unit if the execution status of the one or more instructions is unsuccessful. In another example, the application may be configured to re-send the one or more commands-application protocol data unit if the execution status of the one or more instructions is not received from the first device within a predetermined time, including but not limited to any number of seconds, minutes, hours, days, etc. In yet another example, the application may be configured to notify the server if the one or more commands-application protocol data unit if the execution status of the one or more instructions is successful. In yet another example, the application may be configured to notify the server if the one or more commands-application protocol data unit if the execution status of the one or more instructions is received within the predetermined time.

Figure 4:
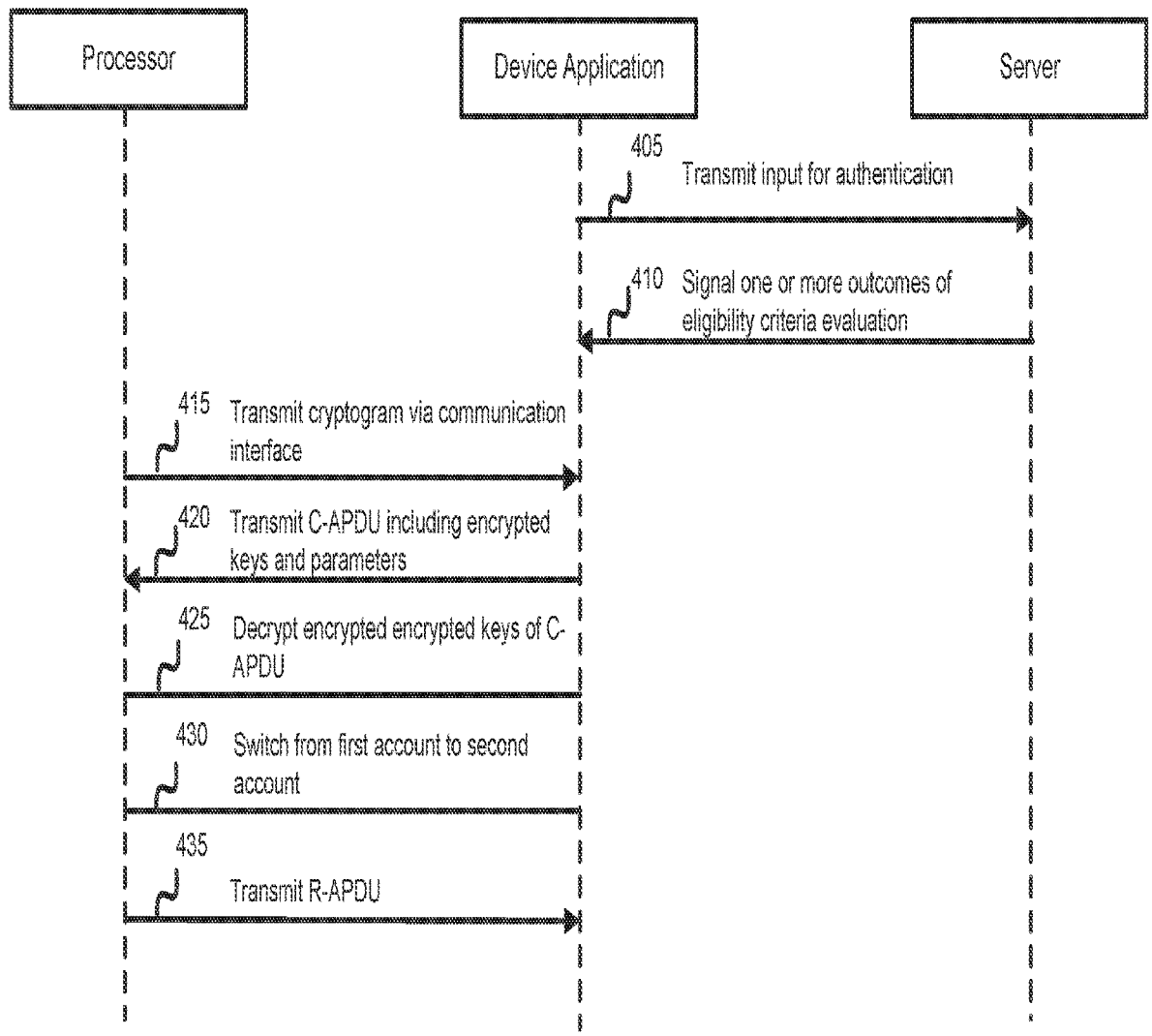
FIG. 4 depicts a sequence diagram of a process for secure reprovisioning according to an exemplary embodiment.

FIG. 4 depicts a sequence diagram 400 of a process for secure reprovisioning according to an exemplary embodiment. FIG. 4 may reference the same or similar components of system 100, first device 200 of FIG. 2A and FIG. 2B, and method 300 of FIG. 3.

At step 405, an application comprising instructions for execution on a device, such as an ATM, a kiosk, a point of sale device, or other device, may be configured to transmit input for authentication to a server. For example, input for the authentication may include, without limitation, at least one or more selected from the group of a personal identification number, a username and/or password, a mobile device number, an account number, a card number, and a biometric (e.g., facial scan, a retina scan, a fingerprint, and a voice input for voice recognition). The application may be configured to authenticate the input. In other examples, the application may be configured to transmit the input to server for authentication of the input.

The device may include one or more processors, and memory. The memory may include one or more applications, including but not limited to first application. The device may be in data communication with any number of components of FIG. 4. For example, the device may transmit data via a network to a server. The device may transmit data via network to a database. Without limitation, the device may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a contact-based card, a thin client, a fat client, an Internet browser, a kiosk, a tablet, a terminal, an ATM, or other device. The device also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The device may include processing circuitry and may contain additional components, including processors, memories, error and parity/CRC checkers, data encoders, anticollision algorithms, controllers, command decoders, security primitives and tamperproofing hardware, as necessary to perform the functions described herein. The device may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

The network may be one or more of a wireless network, a wired network or any combination of wireless network and wired network, and may be configured to connect to any one of components of FIG. 4. In some examples, the network may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network may include, without limitation, telephone lines, fiber optics, IEEE Ethernet 902.3, a wide area network, a wireless personal area network, a LAN, or a global network such as the Internet. In addition, the network may support an Internet network, a wireless communication network, a cellular network, or the like, or any combination thereof. The network may further include one network, or any number of the exemplary types of networks mentioned above, operating as a stand-alone network or in cooperation with each other. The network may utilize one or more protocols of one or more network elements to which they are communicatively coupled. The network may translate to or from other protocols to one or more protocols of network devices. Although the network is depicted as a single network, it should be appreciated that according to one or more examples, the network may comprise a plurality of interconnected networks, such as, for example, the Internet, a service provider's network, a cable television network, corporate networks, such as credit card association networks, and home networks.

The server may include one or more processors coupled to memory. The server may be configured as a central system, server or platform to control and call various data at different times to execute a plurality of workflow actions. The server may be in data communication with one or more applets of a card and/or application of the device. For example, a server may be in data communication with an applet via one or more networks. A card may be in communication with one or more servers via one or more networks, and may operate as a respective front-end to back-end pair with server. The card may transmit, for example from applet executing thereon, one or more requests to server. The one or more requests may be associated with retrieving data from server. The server may receive the one or more requests from the card. Based on the one or more requests from the applet, the server may be configured to retrieve the requested data. The server may be configured to transmit the received data to the applet, the received data being responsive to one or more requests.

In some examples, the server can be a dedicated server computer, such as bladed servers, or can be personal computers, laptop computers, notebook computers, palm top computers, network computers, mobile devices, wearable devices, or any processor-controlled device capable of supporting the system of FIG. 4. While FIG. 4 illustrates a single server, it is understood that other embodiments can use multiple servers or multiple computer systems as necessary or desired to support the users and can also use back-up or redundant servers to prevent network downtime in the event of a failure of a particular server.

The server may include an application comprising instructions for execution thereon. For example, the application may comprise instructions for execution on the server. The application may be in communication with any components of the system. For example, the server may execute one or more applications that enable, for example, network and/or data communications with one or more components of the system and transmit and/or receive data. Without limitation, server may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a contact-based card, a thin client, a fat client, an Internet browser, or other device. The server also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server may include processing circuitry and may contain additional components, including processors, memories, error and parity/CRC checkers, data encoders, anticollision algorithms, controllers, command decoders, security primitives and tamperproofing hardware, as necessary to perform the functions described herein. The server may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

The database may comprise a relational database, a non-relational database, or other database implementations, and any combination thereof, including a plurality of relational databases and non-relational databases. In some examples, the database may comprise a desktop database, a mobile database, or an in-memory database. Further, the database may be hosted internally by any component of the system, such as the card, device, and/or the server, or the database may be hosted externally to any component of the system, such as the card, device, and/or the server, by a cloud-based platform, or in any storage device that is in data communication with the card, device, and/or the server. In some examples, the database may be in data communication with any number of components of the system. For example, the server may be configured to retrieve the requested data from the database that is transmitted by the applet. The server may be configured to transmit the received data from the database to one or more applets via network, the received data being responsive to the transmitted one or more requests. In other examples, the one or more applets may be configured to transmit one or more requests for the requested data from the database via network.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the card, device, server, and/or database, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

At step 410, server may be configured to signal one or more outcomes of eligibility criteria evaluation. For example, the server may be configured to receive the input from the application. The server may be configured to authenticate the input. After input authentication, the server may be configured to signal one or more outcomes of eligibility criteria evaluation associated with the card. The card may be configured to receive the one or more commands-application protocol data unit after determination of a security concern. For example, the server may be configured to determine one or more security concerns. Without limitation, the one or more security concerns may be associated with identity theft, unauthorized usage based on transaction history and/or transaction frequency evaluated over any determined time period, a notice of fraudulent charges, and/or any combination thereof. For example, the server may be configured to, responsive to determining any number of one or more security concerns associated with the card, transmit one or more messages to the application of the device that are indicative of transmitting the one or more commands-application protocol data unit. In this manner, the application of the device may be configured to receive the one or more messages from the server, the one or more messages indicative of transmitting the one or more commands-application protocol data unit after determination of one or more security concerns.

The card may be subject to eligibility criteria. For example, after determination of the one or more security concerns, the card may subject to a prioritized list associated with eligibility prior to receipt of the one or more commands-application protocol data unit. In some examples, the server may be configured to screen the first device based on at least one selected from the group of time elapsed since issuance of the card, card usage for transactions, transaction type, card type, one or more determinations of the security concerns associated with the card, and/or any combination thereof. In this manner, the server may be configured to evaluate and rank how many cards and which types of cards may be configured to receive the one or more commands-application protocol data unit based on the eligibility criteria before signaling to the application of the device to transmit the one or more commands-application protocol data unit.

At step 415, one or more processors of a card may be configured to transmit, via a communication interface, a cryptogram. For example, one or more processors of the card may be configured to create a cryptogram using one or more keys and the counter value. The cryptogram may include the counter value and the transmission data. The first device may include a memory containing one or more keys, a counter value, and the transmission data. The one or more processors may be configured to transmit the cryptogram via a communication interface. For example, the one or more processors may be configured to transmit the cryptogram to one or more applications. In some examples, the one or more processors may be configured to transmit the cryptogram to an application comprising instructions for execution on a second device. The one or more processors may be configured to update the counter value. For example, the one or more processors may be configured to update the counter value after transmission of the cryptogram.

The card may comprise a contactless card, a contact-based card, or other device described herein. As previously explained, the card may include one or more processors, and memory. The memory may include one or more applets and one or more counters. Each counter may include a counter value. The memory may include the counter value, transmission data, and one or more keys.

The card may include a communication interface. The communication interface may comprise communication capabilities with physical interfaces and contactless interfaces. For example, the communication interface may be configured to communicate with a physical interface, such as by swiping through a card swipe interface or inserting into a card chip reader found on the automated teller machine (ATM) or other device configured to communicate over a physical interface. In other examples, the communication interface may be configured to establish contactless communication with a card reading device via a short-range wireless communication method, such as NFC, Bluetooth, Wi-Fi, RFID, and other forms of contactless communication. The communication interface may be configured to communicate directly with the application of the device, the server, and/or database via network.

The card may be in data communication with any number of components of the system. For example, the card may transmit data via network to the application of the second device, and/or server. The card may transmit data via network to database. In some examples, the card may be configured to transmit data via network after entry into one or more communication fields of any device. Without limitation, each entry may be associated with a tap, a swipe, a wave, and/or any combination thereof.

At step 420, the application of the device may be configured to transmit one or more commands-application protocol data unit. For example, the application comprising instructions for execution on the device may be configured to encrypt one or more keys. The application may be configured to transmit the one or more encrypted keys. In some examples, the application may be configured to transmit one or more parameters. Without limitation, the one or more parameters may include at least one selected from the group of primary account number information, expiration date information, card verification code, and/or any combination thereof. In some examples, the one or more parameters may comprise dynamic information, such as changed personalization data including but not limited to card master keys, such as secret and public/private keys, and one or more spending limits. The application may be configured to transmit one or more commands-application protocol data unit including the one or more encrypted keys, the one or more parameters, one or more applet identifiers, and one or more instructions associated with a class of a header. In some examples, one or more session keys may be generated at the second device or server, which may be used to encrypt one or more master keys. In some examples, the application may be configured to transmit the one or more commands-application protocol data unit to the card after one or more entries of the communication interface into a communication field of the device. Communication between the application and the card may occur via near field communication (NFC). Without limitation, the one or more commands-application protocol data unit may be transmitted via Bluetooth, Wi-Fi, RFID.

The card may be configured to receive the one or more encrypted keys and one or more parameters after input authentication. The card may be configured to receive the command-application protocol data unit including the one or more encrypted keys, the one or more parameters, one or more applet identifiers, and one or more instructions associated with a class of a header. In some examples, one or more session keys may be generated at the second device or server, which may be used to encrypt one or more master keys. For example, one or more limited use session keys may be generated based on a cryptogram and a counter to encrypt data. The first device may be configured to receive the encrypted data and decrypt it for storage. The one or more instructions may each be associated with a code, and include decrypting and/or confirmation of the one or more decrypted keys, storing and/or confirmation of the one or more decrypted keys. In some examples, the card may be configured to receive the one or more commands-application protocol data unit after input authentication.

In one example, one or more sets of cards may be prioritized to receive the one or more commands-application protocol data unit after the server is configured to determine whether the first device is a credit card and is associated with a notice of fraudulent charges. In another example, one or more sets of cards may be prioritized to receive the one or more commands-application protocol data unit after the server is configured to determine whether the card is an identification card that has been abnormally used, for example exceeding a predetermined threshold, for one or more transactions. In yet another example, one or more sets of the card may be prioritized to receive the one or more commands-application protocol data unit after the server is configured to determine how much time has elapsed since issuance of the card. In these non-limiting examples, the server may be further configured to prioritize which of these determinations are to be made first, second, third, etc. In this manner, a designated number of cards may be reprovisioned on an individual basis and/or in a batch. The cards may also be reprovisioned on an as-needed basis, according to a predetermined schedule, and/or any combination thereof.

At step 425, the one or more processors of the card may be configured to decrypt one or more encrypted keys of the one or more commands-application protocol data unit. The card may be configured to receive the one or more commands-application protocol data unit. For example, the card may be configured to receive the one or more commands-application protocol data unit from the application of the device. The card may be configured to decrypt the one or more encrypted keys. One or more applets of the card may be configured to store one or more decrypted keys in a secure element. A first applet may be configured to transmit, via a communication channel, the one or more decrypted keys and the one or more parameters to a second applet.

At step 430, the one or more processors the card may be configured to switch from a first account to a second account. For example, after decryption of the one or more encrypted keys, the card may be configured to change an association from a first account to a second account. Moreover, the card may be restricted to a predetermined usage after decryption of the one or more encrypted keys. In one example, the card may be subject to one or more predetermined spending thresholds. In another example, the card may be subject to a predetermined number of uses. For example, the card may be used for only a designated set of transactions, such as for lunch only and/or for office furniture. In another example, the card may be subject to a predetermined number of usages for one or more types of transactions, including but not limited to a debit card transaction or a credit card transaction.

In another example, the card may be used for only transactions occurring during a certain time (e.g., business hours of 9:00 am to 5:00 pm), on certain days of the week (e.g., weekdays, weekends, only Mondays, only Thursdays and Fridays), of on a certain date (e.g., Wednesday, Jul. 1, 2020). In another example, the card may be used only for certain purposes, such as for expense account purposes (e.g., travel expenses including airfare, meals, and hotels), for a designated project (e.g., a certain type of equipment or hardware needed for a project), with designated or approved merchants, or with a specified list of merchants known to offer goods or services needed for a particular purposes.

It is understood that the foregoing listings are exemplary and that any of these examples can be used in combination with one another. Thus, a user may use the same card configured for a variety of purposes and with a variety of accounts.

At step 435, the one or more processors of the card may be configured to transmit one or more responses-application protocol data unit. For example, the card may be configured to transmit, responsive to the one or more commands-application protocol data unit, one or more responses-application protocol data unit. The one or more responses-application protocol data unit may include one or bytes indicative of a status of the command. For example, at least one of the one or more responses-application protocol data unit may be configured to indicate an execution status associated with the one or more instructions. The card may be configured to transmit the one or more responses-application protocol data unit to the application of the device. In some examples, the card may be configured to return a successful execution status associated with the one or more instructions. To the extent that the execution status of the one or more instructions is not successful, the card may be configured to return a warning or unsuccessful execution status. For example, the one or more responses-application protocol data unit may be configured to indicate if and when the one or more encrypted keys were decrypted and/or if and when the one or more decrypted keys were stored.

Figure 5:
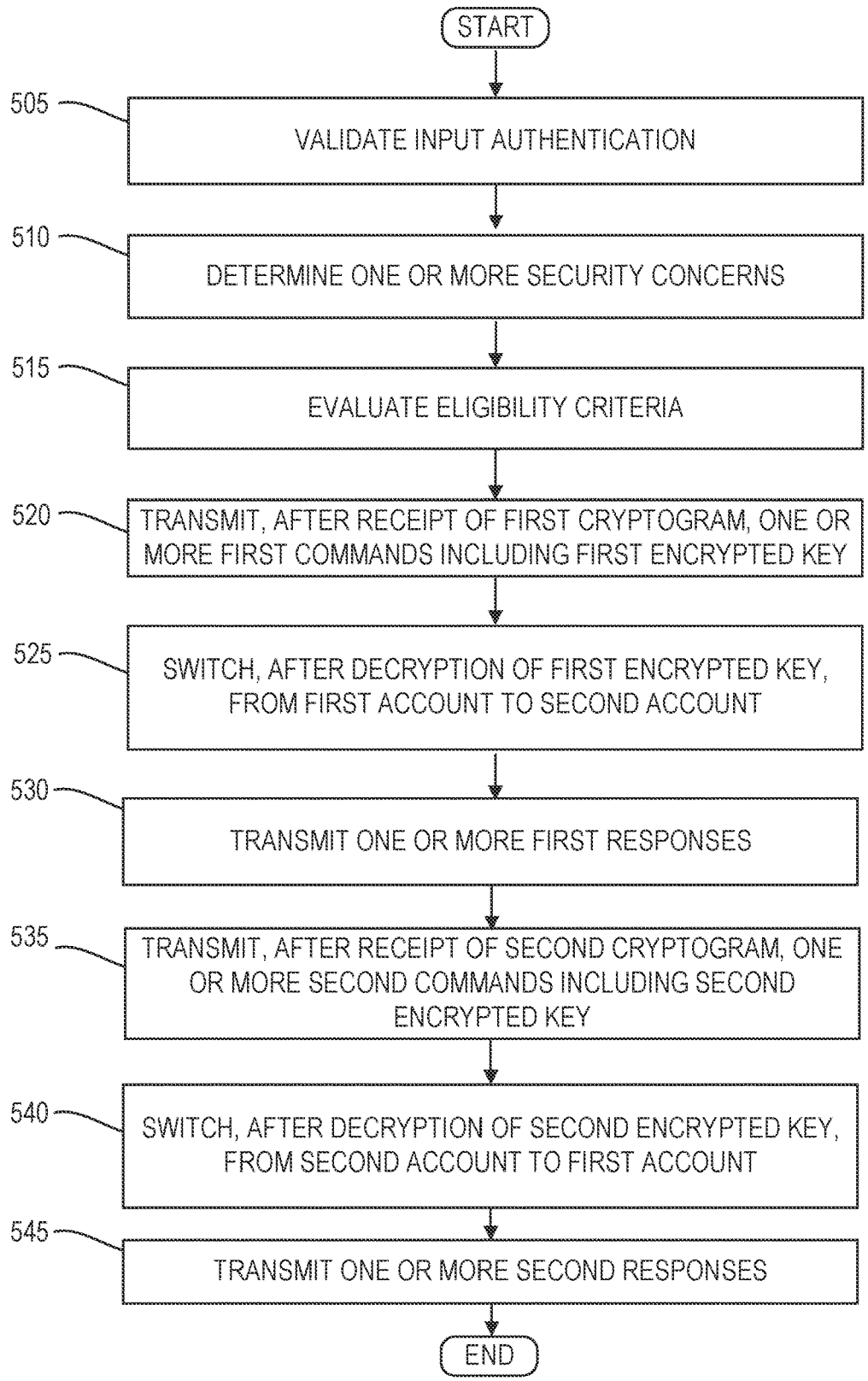
FIG. 5 depicts a method of secure reprovisioning according to an exemplary embodiment.

FIG. 5 depicts a method 500 of secure reprovisioning according to an exemplary embodiment. FIG. 5 may reference the same or similar components of system 100, first device 200 of FIG. 2A and FIG. 2B, method 300 of FIG. 3, and sequence diagram 400 of FIG. 4.

At block 505, the method 500 may include validating input authentication. In some examples, an application of a device, such as an ATM, a kiosk, a point of sale device, or other device, may be configured to validate input authentication. In other examples, the application of the device may be configured to transmit input to a server for authentication. For example, input for the authentication may include, without limitation, at least one or more selected from the group of a personal identification number, a username and/or password, a mobile device number, an account number, a card number, and a biometric (e.g., facial scan, a retina scan, a fingerprint, and a voice input for voice recognition).

The device may include one or more processors, and memory. The memory may include one or more applications, including but not limited to first application. The device may be in data communication with any number of components. For example, the device may transmit data via a network to a server. The device may transmit data via network to a database. Without limitation, the device may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device. The device also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The device may include processing circuitry and may contain additional components, including processors, memories, error and parity/CRC checkers, data encoders, anticollision algorithms, controllers, command decoders, security primitives and tamperproofing hardware, as necessary to perform the functions described herein. The device may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

The network may be one or more of a wireless network, a wired network or any combination of wireless network and wired network, and may be configured to connect to any one of components. In some examples, the network may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network may include, without limitation, telephone lines, fiber optics, IEEE Ethernet 902.3, a wide area network, a wireless personal area network, a LAN, or a global network such as the Internet. In addition, the network may support an Internet network, a wireless communication network, a cellular network, or the like, or any combination thereof. The network may further include one network, or any number of the exemplary types of networks mentioned above, operating as a stand-alone network or in cooperation with each other. The network may utilize one or more protocols of one or more network elements to which they are communicatively coupled. The network may translate to or from other protocols to one or more protocols of network devices. Although the network is depicted as a single network, it should be appreciated that according to one or more examples, the network may comprise a plurality of interconnected networks, such as, for example, the Internet, a service provider's network, a cable television network, corporate networks, such as credit card association networks, and home networks.

The server may include one or more processors coupled to memory. The server may be configured as a central system, server or platform to control and call various data at different times to execute a plurality of workflow actions. The server may be in data communication with one or more applets of a card and/or application of the device. For example, a server may be in data communication with an applet via one or more networks. A card may be in communication with one or more servers via one or more networks, and may operate as a respective front-end to back-end pair with server. The card may transmit, for example from applet executing thereon, one or more requests to server. The one or more requests may be associated with retrieving data from server. The server may receive the one or more requests from the card. Based on the one or more requests from the applet, the server may be configured to retrieve the requested data. The server may be configured to transmit the received data to the applet, the received data being responsive to one or more requests.

In some examples, the server can be a dedicated server computer, such as bladed servers, or can be personal computers, laptop computers, notebook computers, palm top computers, network computers, mobile devices, wearable devices, or any processor-controlled device capable of supporting system components of FIG. 5. It is understood that other embodiments can use multiple servers or multiple computer systems as necessary or desired to support the users and can also use back-up or redundant servers to prevent network downtime in the event of a failure of a particular server.

The server may include an application comprising instructions for execution thereon. For example, the application may comprise instructions for execution on the server. The application may be in communication with any components of the system. For example, the server may execute one or more applications that enable, for example, network and/or data communications with one or more components of the system and transmit and/or receive data. Without limitation, server may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The server also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server may include processing circuitry and may contain additional components, including processors, memories, error and parity/CRC checkers, data encoders, anticollision algorithms, controllers, command decoders, security primitives and tamperproofing hardware, as necessary to perform the functions described herein. The server may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

The database may comprise a relational database, a non-relational database, or other database implementations, and any combination thereof, including a plurality of relational databases and non-relational databases. In some examples, the database may comprise a desktop database, a mobile database, or an in-memory database. Further, the database may be hosted internally by any component of the system, such as the card, device, and/or the server, or the database may be hosted externally to any component of the system, such as the card, device, and/or the server, by a cloud-based platform, or in any storage device that is in data communication with the card, device, and/or the server. In some examples, the database may be in data communication with any number of components of the system. For example, the server may be configured to retrieve the requested data from the database that is transmitted by the applet. The server may be configured to transmit the received data from the database to one or more applets via network, the received data being responsive to the transmitted one or more requests. In other examples, the one or more applets may be configured to transmit one or more requests for the requested data from the database via network.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the card, device, server, and/or database, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

At block 510, the method 500 may include determining one or more security concerns. For example, the server may be configured to determine one or more security concerns. Without limitation, the one or more security concerns may be associated with identity theft, unauthorized usage based on transaction history and/or transaction frequency evaluated over any determined time period, a notice of fraudulent charges, and/or any combination thereof.

At block 515, the method 500 may include evaluating eligibility criteria. server may be configured to signal one or more outcomes of eligibility criteria evaluation. For example, the server may be configured to receive the input from the application. The server may be configured to authenticate the input. After input authentication, the server may be configured to signal one or more outcomes of eligibility criteria evaluation associated with the card. The card may be configured to receive the one or more commands-application protocol data unit after determination of a security concern. For example, the server may be configured to, responsive to determining any number of one or more security concerns associated with the card, transmit one or more messages to the application of the device that are indicative of transmitting the one or more commands-application protocol data unit. In this manner, the application of the device may be configured to receive the one or more messages from the server, the one or more messages indicative of transmitting the one or more commands-application protocol data unit after determination of one or more security concerns.

The card may be subject to eligibility criteria. For example, after determination of the one or more security concerns, the card may subject to a prioritized list associated with eligibility prior to receipt of the one or more commands-application protocol data unit. In some examples, the server may be configured to screen the first device based on at least one selected from the group of time elapsed since issuance of the card, card usage for transactions, transaction type, card type, one or more determinations of the security concerns associated with the card, and/or any combination thereof. In this manner, the server may be configured to evaluate and rank how many cards and which types of cards may be configured to receive the one or more commands-application protocol data unit based on the eligibility criteria before signaling to the application of the device to transmit the one or more commands-application protocol data unit.

At block 520, the method 500 may include transmitting, after receipt of a first cryptogram, one or more first commands. For example, one or more processors of a card may be configured to transmit, via a communication interface, a first cryptogram. For example, one or more processors of the card may be configured to create a first cryptogram using one or more keys and the counter value. The first cryptogram may include the counter value and the transmission data. The card may include a memory containing one or more keys, a counter value, and the transmission data. The one or more processors may be configured to transmit the first cryptogram via a communication interface. For example, the one or more processors may be configured to transmit the first cryptogram to one or more applications. In some examples, the one or more processors may be configured to transmit the first cryptogram to an application comprising instructions for execution on the device. The one or more processors may be configured to update the counter value. For example, the one or more processors may be configured to update the counter value after transmission of the first cryptogram.

The card may comprise a contactless card, a contact-based card, or other device described herein. As previously explained, the card may include one or more processors, and memory. The memory may include one or more applets and one or more counters. Each counter may include a counter value. The memory may include the counter value, transmission data, and one or more keys.

The card may include a communication interface. The communication interface may comprise communication capabilities with physical interfaces and contactless interfaces. For example, the communication interface may be configured to communicate with a physical interface, such as by swiping through a card swipe interface or inserting into a card chip reader found on the automated teller machine (ATM) or other device configured to communicate over a physical interface. In other examples, the communication interface may be configured to establish contactless communication with a card reading device via a short-range wireless communication method, such as NFC, Bluetooth, Wi-Fi, RFID, and other forms of contactless communication. The communication interface may be configured to communicate directly with the application of the device, the server, and/or database via network.

The card may be in data communication with any number of components of the system. For example, the card may transmit data via network to the application of the second device, and/or server. The card may transmit data via network to database. In some examples, the card may be configured to transmit data via network after entry into one or more communication fields of any device. Without limitation, each entry may be associated with a tap, a swipe, a wave, and/or any combination thereof.

The application of the device may be configured to transmit one or more first commands-application protocol data unit. For example, the application comprising instructions for execution on the device may be configured to encrypt one or more keys. The application may be configured to transmit the one or more first encrypted keys. In some examples, the application may be configured to transmit one or more first parameters. Without limitation, the one or more parameters may include at least one selected from the group of primary account number information, expiration date information, card verification code, and/or any combination thereof. In some examples, the one or more parameters may comprise dynamic information, such as changed personalization data including but not limited to card master keys, such as secret and public/private keys, and one or more spending limits. The application may be configured to transmit one or more first commands-application protocol data unit including the one or more first encrypted keys, the one or more first parameters, one or more first applet identifiers, and one or more instructions associated with a class of a header. In some examples, one or more session keys may be generated at the second device or server, which may be used to encrypt one or more master keys. In some examples, the application may be configured to transmit the one or more first commands-application protocol data unit to the card after one or more entries of the communication interface into a communication field of the device. Communication between the application of the first device and the card may occur via near field communication (NFC). Without limitation, the one or more first commands-application protocol data unit may be transmitted via Bluetooth, Wi-Fi, RFID.

At block 525, the method 500 may include switching, after decryption of first encrypted key, from a first account to a second account. The card may be configured to receive the one or more first encrypted keys and one or more first parameters from the application. The card may be configured to receive the first command-application protocol data unit including the one or more first encrypted keys, the one or more first parameters, one or more first applet identifiers, and one or more instructions associated with a class of a header. In some examples, one or more session keys may be generated at the second device or server, which may be used to encrypt one or more master keys. For example, one or more limited use session keys may be generated based on a cryptogram and a counter to encrypt data. The first device may be configured to receive the encrypted data and decrypt it for storage. The one or more instructions may each be associated with a code, and include decrypting and/or confirmation of the one or more first decrypted keys, storing and/or confirmation of the one or more first decrypted keys. In some examples, the card may be configured to receive the one or more first commands-application protocol data unit after input authentication.

In one example, one or more sets of cards may be prioritized to receive the one or more first commands-application protocol data unit after the server is configured to determine whether the first device is a credit card and is associated with a notice of fraudulent charges. In another example, one or more sets of cards may be prioritized to receive the one or more first commands-application protocol data unit after the server is configured to determine whether the card is an identification card that has been abnormally used, for example exceeding a predetermined threshold, for one or more transactions. In yet another example, one or more sets of the card may be prioritized to receive the one or more first commands-application protocol data unit after the server is configured to determine how much time has elapsed since issuance of the card. In these non-limiting examples, the server may be further configured to prioritize which of these determinations are to be made first, second, third, etc. In this manner, a designated number of cards may be reprovisioned on an individual basis and/or in a batch. The cards may also be reprovisioned on an as-needed basis, according to a predetermined schedule, and/or any combination thereof.

The one or more processors of the card may be configured to decrypt one or more first encrypted keys of the one or more first commands-application protocol data unit. The card may be configured to receive the one or more first commands-application protocol data unit. For example, the card may be configured to receive the one or more first commands-application protocol data unit from the application of the first device. The card may be configured to decrypt the one or more first encrypted keys. One or more applets of the card may be configured to store one or more first decrypted keys in a secure element. A first applet may be configured to transmit, via a communication channel, the one or more first decrypted keys and the one or more first parameters to a second applet.

The one or more processors the card may be configured to switch from a first account to a second account. For example, after decryption of the one or more first encrypted keys, the card may be configured to change an association from a first account to a second account. Moreover, the card may be restricted to a predetermined usage after decryption of the one or more first encrypted keys. In one example, the card may be subject to one or more predetermined spending thresholds. In another example, the card may be subject to a predetermined number of uses. For example, the card may be used for only a designated set of transactions, such as for lunch only and/or for office furniture. In another example, the card may be subject to a predetermined number of usages for one or more types of transactions, including but not limited to a debit card transaction or a credit card transaction.

In another example, the card may be used for only transactions occurring during a certain time (e.g., business hours of 9:00 am to 5:00 pm), on certain days of the week (e.g., weekdays, weekends, only Mondays, only Thursdays and Fridays), of on a certain date (e.g., Wednesday, Jul. 1, 2020). In another example, the card may be used only for certain purposes, such as for expense account purposes (e.g., travel expenses including airfare, meals, and hotels), for a designated project (e.g., a certain type of equipment or hardware needed for a project), with designated or approved merchants, or with a specified list of merchants known to offer goods or services needed for a particular purposes.

It is understood that the foregoing listings are exemplary and that any of these examples can be used in combination with one another. Thus, a user may use the same card configured for a variety of purposes and with a variety of accounts.

At block 530, the method 500 may include transmitting one or more first responses. For example, the one or more processors of the card may be configured to transmit one or more first responses-application protocol data unit. For example, the card may be configured to transmit, responsive to the one or more first commands-application protocol data unit, one or more first responses-application protocol data unit. The one or more first responses-application protocol data unit may include one or bytes indicative of a status of the command. For example, at least one of the one or more first responses-application protocol data unit may be configured to indicate an execution status associated with the one or more instructions. The card may be configured to transmit the one or more first responses-application protocol data unit to the application of the device. In some examples, the card may be configured to return a successful execution status associated with the one or more instructions. To the extent that the execution status of the one or more instructions is not successful, the card may be configured to return a warning or unsuccessful execution status. For example, the one or more first responses-application protocol data unit may be configured to indicate if and when the first encrypted key was decrypted and/or if and when the one or more first decrypted key was stored.

At block 535, the method 500 may include transmitting, after receipt of a second cryptogram, one or more second commands. For example, one or more processors of a card may be configured to transmit, via a communication interface, a second cryptogram. For example, one or more processors of the card may be configured to create a second cryptogram using one or more keys and the counter value. The second cryptogram may include the counter value and the transmission data. The card may include a memory containing one or more keys, a counter value, and the transmission data. The one or more processors may be configured to transmit the second cryptogram via a communication interface. For example, the one or more processors may be configured to transmit the second cryptogram to one or more applications. In some examples, the one or more processors may be configured to transmit the second cryptogram to an application comprising instructions for execution on the second device. The application comprising instructions for execution on the second device may be different from the application comprising instructions for execution on the first device. In some examples, application for the first device may comprise an application comprising instructions for execution on a first ATM at a first location, and an application for the second device may comprise an application comprising instructions for execution on a second ATM at a second location. The one or more processors may be configured to update the counter value. For example, the one or more processors may be configured to update the counter value after transmission of the second cryptogram.

The application of a second device may be configured to transmit one or more second commands-application protocol data unit. For example, the application comprising instructions for execution on the second device may be configured to encrypt one or more second keys. The application of the second device may be configured to transmit the one or more second encrypted keys. In some examples, the application may be configured to transmit one or more second parameters. Without limitation, the one or more second parameters may include at least one selected from the group of primary account number information, expiration date information, card verification code, and/or any combination thereof. In some examples, the one or more second parameters may comprise dynamic information, such as changed personalization data including but not limited to card master keys, such as secret and public/private keys, and one or more spending limits. The application may be configured to transmit one or more second commands-application protocol data unit including the one or more second encrypted keys, the one or more second parameters, one or more second applet identifiers, and one or more instructions associated with a class of a header. In some examples, one or more session keys may be generated at the second device or server, which may be used to encrypt one or more master keys. In some examples, the application may be configured to transmit the one or more second commands-application protocol data unit to the card after one or more entries of the communication interface into a communication field of the device. Communication between the application of the second device and the card may occur via near field communication (NFC). Without limitation, the one or more second commands-application protocol data unit may be transmitted via Bluetooth, Wi-Fi, RFID.

At block 540, the method 500 may include switching, after decryption of the second encrypted key, from the second account to the first account. The card may be configured to receive the one or more second encrypted keys and one or more second parameters from the application. The card may be configured to receive the second command-application protocol data unit including the one or more second encrypted keys, the one or more second parameters, one or more second applet identifiers, and one or more instructions associated with a class of a header. In some examples, one or more session keys may be generated at the second device or server, which may be used to encrypt one or more master keys. For example, one or more limited use session keys may be generated based on a cryptogram and a counter to encrypt data. The first device may be configured to receive the encrypted data and decrypt it for storage. The one or more instructions may each be associated with a code, and include decrypting and/or confirmation of the one or more second decrypted keys, storing and/or confirmation of the one or more second decrypted keys. In some examples, the card may be configured to receive the one or more second commands-application protocol data unit after input authentication.

In one example, one or more sets of cards may be prioritized to receive the one or more second commands-application protocol data unit after the server is configured to determine whether the card is a credit card and is associated with a notice of fraudulent charges. In another example, one or more sets of cards may be prioritized to receive the one or more second commands-application protocol data unit after the server is configured to determine whether the card is an identification card that has been abnormally used, for example exceeding a predetermined threshold, for one or more transactions. In yet another example, one or more sets of the card may be prioritized to receive the one or more second commands-application protocol data unit after the server is configured to determine how much time has elapsed since issuance of the card. In these non-limiting examples, the server may be further configured to prioritize which of these determinations are to be made first, second, third, etc. In this manner, a designated number of cards may be reprovisioned on an individual basis and/or in a batch. The cards may also be reprovisioned on an as-needed basis, according to a predetermined schedule, and/or any combination thereof.

The one or more processors of the card may be configured to decrypt one or more second encrypted keys of the one or more second commands-application protocol data unit. The card may be configured to receive the one or more second commands-application protocol data unit. For example, the card may be configured to receive the one or more second commands-application protocol data unit from the application of the second device. The card may be configured to decrypt the one or more second encrypted keys. One or more applets of the card may be configured to store one or more second decrypted keys in a secure element. A first applet may be configured to transmit, via a communication channel, the one or more second decrypted keys and the one or more second parameters to a second applet.

The one or more processors the card may be configured to switch from the second account to the first account. For example, after decryption of the one or more second encrypted keys, the card may be configured to change an association from the second account to a first account. Moreover, the card may be restricted to a predetermined usage after decryption of the one or more second encrypted keys. In one example, the card may be subject to one or more predetermined spending thresholds. In another example, the card may be subject to a predetermined number of uses. For example, the card may be used for only a designated set of transactions, such as for lunch only and/or for office furniture. In another example, the card may be subject to a predetermined number of usages for one or more types of transactions, including but not limited to a debit card transaction or a credit card transaction.

In another example, the card may be used for only transactions occurring during a certain time (e.g., business hours of 9:00 am to 5:00 pm), on certain days of the week (e.g., weekdays, weekends, only Mondays, only Thursdays and Fridays), of on a certain date (e.g., Wednesday, Jul. 1, 2020). In another example, the card may be used only for certain purposes, such as for expense account purposes (e.g., travel expenses including airfare, meals, and hotels), for a designated project (e.g., a certain type of equipment or hardware needed for a project), with designated of approved merchants, or with a specified list of merchants known to offer goods or services needed for a particular purposes.

It is understood that the foregoing listings are exemplary and that any of these examples can be used in combination with one another. Thus, a user may use the same card configured for a variety of purposes and with a variety of accounts.

At block 545, the method 500 may include transmitting one or more second responses. For example, the one or more processors of the card may be configured to transmit one or more second responses-application protocol data unit. For example, the card may be configured to transmit, responsive to the one or more second commands-application protocol data unit, one or more responses-application protocol data unit. The one or more second responses-application protocol data unit may include one or bytes indicative of a status of the command. For example, at least one of the one or more second responses-application protocol data unit may be configured to indicate an execution status associated with the one or more instructions. The card may be configured to transmit the one or more second responses-application protocol data unit to the application of the device. In some examples, the card may be configured to return a successful execution status associated with the one or more instructions. To the extent that the execution status of the one or more instructions is not successful, the card may be configured to return a warning or unsuccessful execution status. For example, the one or more second responses-application protocol data unit may be configured to indicate if and when the second encrypted key was decrypted and/or if and when the one or more second decrypted key was stored.

Figure 6:
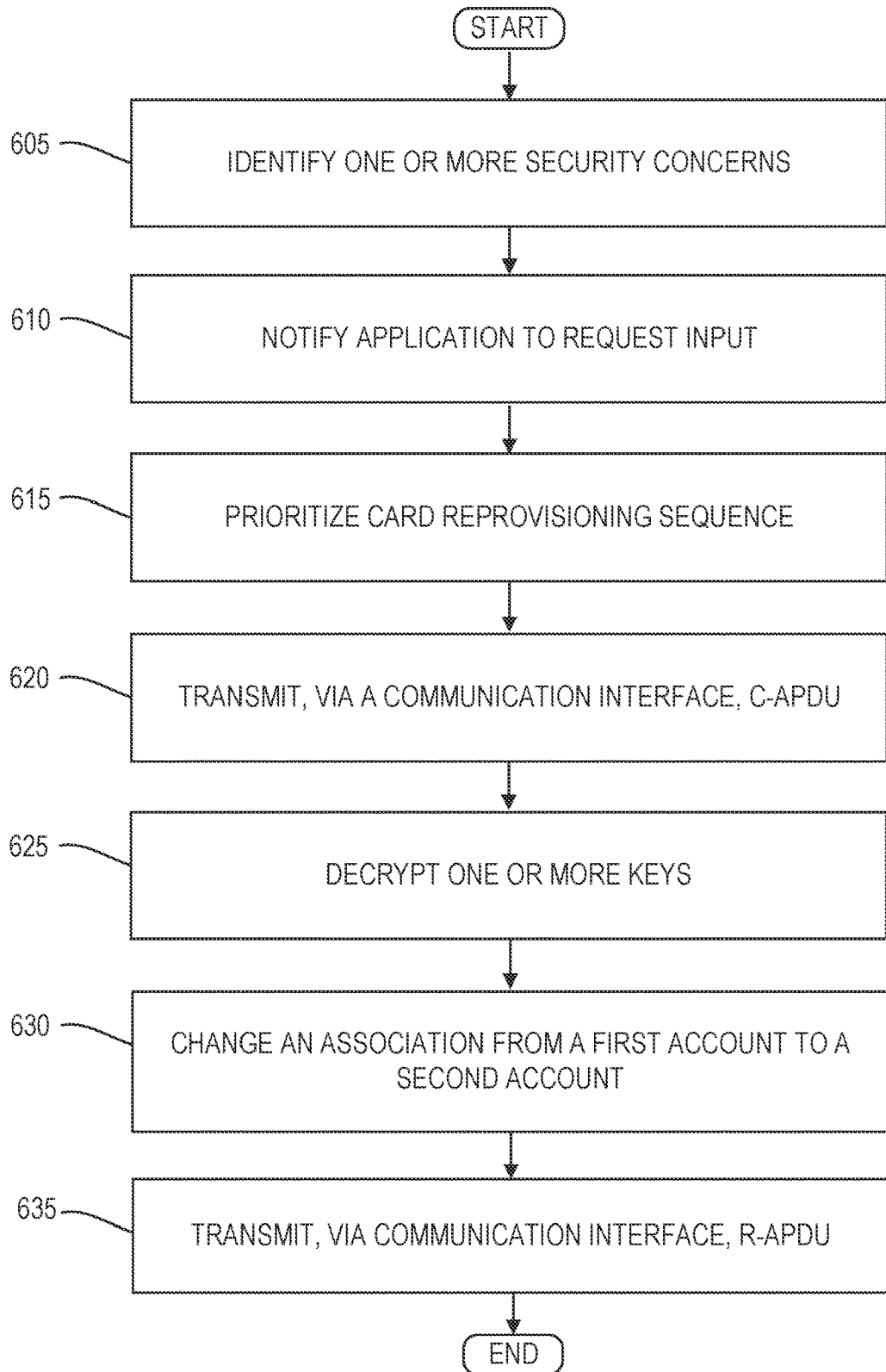
FIG. 6 depicts a method of secure according to an exemplary embodiment.

FIG. 6 depicts a method 600 for secure reprovisioning according to an exemplary embodiment. FIG. 6 may reference the same or similar components of system 100, first device 200 of FIG. 2A and FIG. 2B, method 300 of FIG. 3, sequence diagram 400 of FIG. 4, and method 500 of FIG. 5.

At block 605, the method 600 may include identifying one or more security concerns. In some examples, a first device may be configured to receive one or more commands-application protocol data unit after determination of a security concern. For example, a server may be configured to determine one or more security concerns. Without limitation, the one or more security concerns may be associated with identity theft, unauthorized usage based on transaction history and/or transaction frequency evaluated over any determined time period, a notice of fraudulent charges, and/or any combination thereof.

At block 610, the method 600 may include notifying an application of a device to request input. Based on one or more determinations by the server, one or more notifications may be transmitted to an application comprising instructions for execution on a second device. For example, the application may be configured to request input for authentication. For example, input for the authentication may include, without limitation, at least one or more selected from the group of a personal identification number, a username and/or password, a mobile device number, an account number, a card number, and a biometric (e.g., facial scan, a retina scan, a fingerprint, and a voice input for voice recognition). The application may be configured to authenticate the input. In other examples, the server may be configured to authenticate the input based on one or more requests transmitted from the application to the server.

At block 615, the method 600 may include prioritizing card reprovisioning sequence. For example, the server may be configured to prioritize card reprovisioning. The first device may be subject to eligibility criteria. For example, after determination of the one or more security concerns, the first device may subject to a prioritized list associated with eligibility prior to receipt of the one or more commands-application protocol data unit. In some examples, the server may be configured to screen the first device based on at least one selected from the group of time elapsed since issuance of the card, card usage for transactions, transaction type, card type, one or more determinations of the security concerns associated with the first device, and/or any combination thereof. In this manner, the server may be configured to evaluate and rank how many first devices and which types of first devices may be configured to receive the one or more commands-application protocol data unit based on the eligibility criteria before signaling to the application of the second device to transmit the one or more commands-application protocol data unit. In one example, one or more sets of first devices may be prioritized to receive the one or more commands-application protocol data unit after the server is configured to determine whether the first device is a credit card and is associated with a notice of fraudulent charges. In another example, one or more sets of first devices may be prioritized to receive the one or more commands-application protocol data unit after the server is configured to determine whether the first device is an identification card that has been abnormally used, for example exceeding a predetermined threshold, for one or more transactions. In yet another example, one or more sets of first device may be prioritized to receive the one or more commands-application protocol data unit after the server is configured to determine how much time has elapsed since issuance of the first device. In these non-limiting examples, the server may be further configured to prioritize which of these determinations are to be made first, second, third, etc. In this manner, a designated number of first devices may be reprovisioned on an individual basis and/or in a batch. The first devices may also be reprovisioned on an as-needed basis, according to a predetermined schedule, and/or any combination thereof.

At block 620, the method 600 may include transmitting, via a communication interface, a command-application protocol data unit. In some examples, the application comprising instructions for execution on the second device may be configured to encrypt one or more keys. Without limitation, the second device may comprise an ATM, a kiosk, a point of sale device, or other device. The application may be configured to transmit the one or more encrypted keys. In some examples, the application may be configured to transmit one or more parameters. Without limitation, the one or more parameters may include at least one selected from the group of primary account number information, expiration date information, card verification code, and/or any combination thereof. In some examples, the one or more parameters may comprise dynamic information, such as changed personalization data including but not limited to card master keys, such as secret and public/private keys, and one or more spending limits. The application may be configured to transmit one or more commands-application protocol data unit including the one or more encrypted keys, the one or more parameters, one or more applet identifiers, and one or more instructions associated with a class of a header. In some examples, one or more session keys may be generated at the second device or server, which may be used to encrypt one or more master keys. In some examples, the application may be configured to transmit the one or more commands-application protocol data unit to the first device after one or more entries of the communication interface into a communication field of the second device. Communication between the application and first device via near field communication (NFC). Without limitation, the one or more commands-application protocol data unit may be transmitted via Bluetooth, Wi-Fi, RFID.

At block 625, the method 600 may include decrypting one or more keys. The first device may be configured to receive the command-application protocol data unit including the one or more encrypted keys, the one or more parameters, one or more applet identifiers, and one or more instructions associated with a class of a header. In some examples, one or more session keys may be generated at the second device or server, which may be used to encrypt one or more master keys. For example, one or more limited use session keys may be generated based on a cryptogram and a counter to encrypt data. The first device may be configured to receive the encrypted data and decrypt it for storage. The one or more instructions may each be associated with a code, and include decrypting and/or confirmation of the one or more decrypted keys, storing and/or confirmation of the one or more decrypted keys.

The first device may be configured to receive the one or more commands-application protocol data unit. For example, the first device may be configured to receive the one or more commands-application protocol data unit from the application of the second device. The first device may be configured to decrypt the one or more encrypted keys. One or more applets of the first device may be configured to store one or more decrypted keys in a secure element. A first applet may be configured to transmit, via a communication channel, the one or more decrypted keys and the one or more parameters to a second applet.

At block 630, the method 600 may include changing an association from a first account to a second account. After decryption of the one or more encrypted keys, the first device may be configured to change an association from a first account to a second account. Moreover, the first device may be restricted to a predetermined usage after decryption of the one or more encrypted keys. In one example, the first device may be subject to one or more predetermined spending thresholds. In another example, the first device may be subject to a predetermined number of uses. For example, the first device may be used for only a designated set of transactions, such as for lunch only and/or for office furniture. In another example, the first device may be subject to a predetermined number of usages for one or more types of transactions, including but not limited to a debit card transaction or a credit card transaction.

In another example, the first device may be used for only transactions occurring during a certain time (e.g., business hours of 9:00 am to 5:00 pm), on certain days of the week (e.g., weekdays, weekends, only Mondays, only Thursdays and Fridays), of on a certain date (e.g., Wednesday, Jul. 1, 2020). In another example, the first device may be used only for certain purposes, such as for expense account purposes (e.g., travel expenses including airfare, meals, and hotels), for a designated project (e.g., a certain type of equipment or hardware needed for a project), with designated or approved merchants, or with a specified list of merchants known to offer goods or services needed for a particular purposes.

It is understood that the foregoing listings are exemplary and that any of these examples can be used in combination with one another. Thus, a user may use the same card configured for a variety of purposes and with a variety of accounts.

At block 635, the method 600 may include transmitting, via the communication interface, a response-application protocol data unit. The first device may be configured to transmit, responsive to the one or more commands-application protocol data unit, one or more responses-application protocol data unit. The one or more responses-application protocol data unit may include one or bytes indicative of a status of the command. For example, at least one of the one or more responses-application protocol data unit may be configured to indicate an execution status associated with the one or more instructions. The first device may be configured to transmit the one or more responses-application protocol data unit to the application of the second device. In some examples, the first device may be configured to return a successful execution status associated with the one or more instructions. To the extent that the execution status of the one or more instructions is not successful, the first device may be configured to return a warning or unsuccessful execution status. For example, the one or more responses-application protocol data unit may be configured to indicate if and when the one or more encrypted keys were decrypted and/or if and when the one or more decrypted keys were stored.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A secure reprovisioning system, comprising:
a first device having an association with a first account, comprising:
a memory containing one or more applets, a counter value, and transmission data;
a communication interface; and
one or more processors in communication with the memory and the communication interface;
wherein the first device is configured to:
create a cryptogram based on the counter value, wherein the cryptogram includes the counter value and the transmission data,
transmit, after entry of the communication interface into a communication field, the cryptogram,
update, after transmission of the cryptogram, the counter value,
receive, via the communication interface, one or more encrypted keys and one or more parameters,
decrypt the one or more encrypted keys, and
after decryption of the one or more encrypted keys, switch the association of the first device from the first account to a second account.

2. The secure reprovisioning system of claim 1, wherein the first device is configured to receive the one or more encrypted keys and the one or more parameters after a determination of a security concern.

3. The secure reprovisioning system of claim 1, wherein the first device is subject to one or more eligibility criteria prior to receiving the one or more encrypted keys and the one or more parameters.

4. The secure reprovisioning system of claim 1, wherein the one or more parameters comprises a primary account number.

5. The secure reprovisioning system of claim 1, wherein the one or more applets are configured to store the one or more decrypted keys in a secure element.

6. The secure reprovisioning system of claim 1, wherein the first device is configured to receive the one or more encrypted keys and the one or more parameters on a predetermined time basis.

7. The secure reprovisioning system of claim 1, wherein the one or more encrypted keys and the one or more parameters are received from a first automated teller machine (ATM) at a first location.

8. The secure reprovisioning system of claim 1, wherein the first device is restricted to a predetermined use.

9. The secure reprovisioning system of claim 1, wherein a first applet is configured to transmit, via a communication channel, the one or more decrypted keys and one or more parameters to a second applet.

10. The secure reprovisioning system of claim 1, wherein the first device is configured to receive a command-application protocol data unit including the one or more encrypted keys, the one or more parameters, one or more applet identifiers, and one or more instructions associated with a class.

11. The secure reprovisioning system of claim 10, wherein the first device is configured to transmit, responsive to the command-application protocol data unit, a response-application protocol data unit indicating an execution status associated with the one or more instructions.

12. A method of secure reprovisioning of a payment instrument, comprising:
creating a cryptogram based on a counter value, wherein the cryptogram includes the counter value and transmission data;
transmitting, via a communication interface, the cryptogram;
updating the counter value;

receiving, via the communication interface, a first set of one or more encrypted keys and a first set of one or more parameters;

decrypting the first set of one or more encrypted keys; and changing an association of the payment instrument from a first account to a second account.

13. The method of claim 12, further comprising receiving the first set of one or more encrypted keys and the first set of one or more parameters after a determination of a security concern.

14. The method of claim 12, wherein the association is changed from the first account to the second account in response to a detection of a type of transaction.

15. The method of claim 12, wherein the first set of one or more encrypted keys and the first set of one or more parameters are received from a first automated teller machine (ATM) at a first location.

16. The method of claim 15, further comprising:

receiving, via the communication interface from a second ATM at a second location, a second set of one or more encrypted keys and a second set of one or more parameters;

decrypting the second set of one or more encrypted keys; and changing the association from the second account to the first account.

17. The method of claim 12, further comprising transmitting a response-application protocol data unit indicating an execution status responsive to one or more instructions of a command-application protocol data unit.

18. The method of claim 12, further comprising transmitting, via a communication channel, a first set of one or more decrypted keys and first set of one or more parameters from a first applet to a second applet.

19. The method of claim 12, further comprising receiving, after input authentication, the first set of one or more encrypted keys and the first set of one or more parameters.

20. A non-transitory computer-readable medium storing instructions that, when executed by a processor, cause the processor to perform operations for secure reprovisioning of a payment instrument, the operations comprising:

creating a cryptogram based on a counter value, wherein the cryptogram includes the counter value and transmission data;

transmitting, via a communication interface, the cryptogram;

updating the counter value;

receiving, via the communication interface, a command-application protocol data unit including one or more encrypted keys, one or more parameters, one or more applet identifiers, and one or more instructions associated with a class;

decrypting the one or more encrypted keys in accordance with the one or more instructions;

switching an association of the payment instrument from a first account to a second account; and transmitting a response-application protocol data unit indicating an execution status associated with the one or more instructions.

* * * * *